United States Patent
Ogita et al.

(10) Patent No.: US 12,394,799 B2
(45) Date of Patent: Aug. 19, 2025

(54) SECONDARY BATTERY AND MANUFACTURING METHOD THEREOF

(71) Applicant: SEMICONDUCTOR ENERGY LABORATORY CO., LTD., Atsugi (JP)

(72) Inventors: Kaori Ogita, Kanagawa (JP); Hiroshi Kadoma, Kanagawa (JP); Tomoya Hirose, Kanagawa (JP); Yumiko Yoneda, Kanagawa (JP); Yuji Iwaki, Kanagawa (JP); Tatsuyoshi Takahashi, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 485 days.

(21) Appl. No.: 17/767,987

(22) PCT Filed: Oct. 6, 2020

(86) PCT No.: PCT/IB2020/059349
§ 371 (c)(1),
(2) Date: Apr. 11, 2022

(87) PCT Pub. No.: WO2021/074741
PCT Pub. Date: Apr. 22, 2021

(65) Prior Publication Data
US 2023/0044589 A1 Feb. 9, 2023

(30) Foreign Application Priority Data

Oct. 18, 2019 (JP) .................................. 2019-191411
Oct. 25, 2019 (JP) .................................. 2019-194093

(51) Int. Cl.
*H01M 4/00* (2006.01)
*H01M 4/131* (2010.01)
(Continued)

(52) U.S. Cl.
CPC ........... *H01M 4/628* (2013.01); *H01M 4/131* (2013.01); *H01M 4/366* (2013.01); *H01M 4/525* (2013.01);
(Continued)

(58) Field of Classification Search
CPC ...... H01M 4/62; H01M 10/0585; H01M 4/36; H01M 10/0562; H01M 4/525; H01M 4/131; H01M 4/66; Y02E 60/10
See application file for complete search history.

(56) References Cited

U.S. PATENT DOCUMENTS 7,709,148 B2  5/2010  Kawasato et al.
8,404,001 B2  3/2013  Kuriki
(Continued)

FOREIGN PATENT DOCUMENTS

CN  104272518 A  1/2015
CN  106663840 A  5/2017
(Continued)

OTHER PUBLICATIONS

Ahn et al., Electrode Structure Comprising Barrier Layer, And Method Of Fabricating Of The Same, Apr. 3, 2019, See the Abstract. (Year: 2019).*

(Continued)

*Primary Examiner* — Anca Eoff
*Assistant Examiner* — Monique M Wills
(74) *Attorney, Agent, or Firm* — Fish & Richardson P.C.

(57) ABSTRACT

A secondary battery with excellent cycle performance is provided. The secondary battery is an all-solid-state battery including a positive electrode current collector layer, a base film, a positive electrode active material layer, a buffer layer, and a solid electrolyte layer. The base film contains titanium nitride. The positive electrode active material layer contains lithium cobalt oxide. The buffer layer contains titanium
(Continued)

oxide. The solid electrolyte layer contains a titanium compound. By using titanium oxide for the buffer layer, a side reaction between the positive electrode active material layer and the solid electrolyte layer can be suppressed, and cycle performance can be improved.

16 Claims, 16 Drawing Sheets

(51) Int. Cl.
 *H01M 4/36* (2006.01)
 *H01M 4/525* (2010.01)
 *H01M 4/62* (2006.01)
 *H01M 4/66* (2006.01)
 *H01M 10/0562* (2010.01)
 *H01M 10/0585* (2010.01)
 *H01M 4/02* (2006.01)

(52) U.S. Cl.
 CPC ........... *H01M 4/664* (2013.01); *H01M 4/667* (2013.01); *H01M 10/0562* (2013.01); *H01M 10/0585* (2013.01); *H01M 2004/028* (2013.01); *H01M 2300/0068* (2013.01)

(56) References Cited

U.S. PATENT DOCUMENTS

| | | | |
|---|---|---|---|
| 10,741,828 | B2 | 8/2020 | Ochiai et al. |
| 11,043,660 | B2 | 6/2021 | Ochiai et al. |
| 11,094,927 | B2 | 8/2021 | Kawakami et al. |
| 2010/0190051 | A1 | 7/2010 | Aitken et al. |
| 2011/0059367 | A1 | 3/2011 | Morita et al. |
| 2015/0111110 | A1 | 4/2015 | Watanabe et al. |
| 2017/0149093 | A1 | 5/2017 | Sun et al. |
| 2017/0279155 | A1 | 9/2017 | Sun et al. |
| 2018/0013130 | A1 | 1/2018 | Ochiai et al. |
| 2018/0145317 | A1 | 5/2018 | Momma et al. |
| 2019/0273258 | A1* | 9/2019 | Thomas-Alyea ............ H01M 10/0585 |
| 2020/0099057 | A1 | 3/2020 | Nakayama et al. |
| 2020/0295349 | A1 | 9/2020 | Ochiai et al. |
| 2020/0328402 | A1 | 10/2020 | Ochiai et al. |
| 2020/0343530 | A1 | 10/2020 | Ochiai et al. |
| 2021/0320290 | A9 | 10/2021 | Ochiai et al. |
| 2022/0115637 | A1 | 4/2022 | Ochiai et al. |
| 2022/0173394 | A1 | 6/2022 | Momma et al. |
| 2022/0190313 | A1 | 6/2022 | Ochiai et al. |
| 2022/0190332 | A1 | 6/2022 | Momma et al. |
| 2023/0246198 | A1 | 8/2023 | Ogita et al. |

FOREIGN PATENT DOCUMENTS

| | | | |
|---|---|---|---|
| CN | 108336302 | A | 7/2018 |
| CN | 110612622 | A | 12/2019 |
| EP | 3186852 | A | 7/2017 |
| JP | 2004055247 | A * | 2/2004 |
| JP | 2009259696 | A * | 11/2009 |
| JP | 2013-062242 | A | 4/2013 |
| JP | 2013-232284 | A | 11/2013 |
| JP | 2015-190039 | A | 11/2015 |
| JP | 2016-115617 | A | 6/2016 |
| JP | 2017-529662 | | 10/2017 |
| KR | 2017-0046754 | A | 5/2017 |
| KR | 20190035588 | A * | 4/2019 |
| WO | WO-2010/032159 | | 3/2010 |
| WO | WO-2013/161310 | | 10/2013 |
| WO | WO-2016/033453 | | 3/2016 |
| WO | WO-2017/053473 | | 3/2017 |
| WO | WO-2018/220991 | | 12/2018 |

OTHER PUBLICATIONS

Kanda et al., Lithium Cell, Nov. 5, 2009, See the Abstract. (Year: 2009).*

Kuge et al., Secondary Battery and Collector for It, Feb. 19, 2004, See the Abstract. (Year: 2004).*

International Search Report (Application No. PCT/IB2020/059349) Dated Dec. 28, 2020.

Written Opinion (Application No. PCT/IB2020/059349) Dated Dec. 28, 2020.

\* cited by examiner

LiCoO₂ R3̄m(001)

TiN Fm3̄m (111)

101

104

LiCoO₂ R3̄m(001)

TiO₂ P42/mnm(100)

101

104

700

705A

750

SECONDARY BATTERY AND MANUFACTURING METHOD THEREOF

CROSS REFERENCE TO RELATED APPLICATIONS

This application is a U.S. National Phase Application under 35 U.S.C. § 371 of International Application PCT/IB2020/059349, filed on Oct. 6, 2020, which is incorporated by reference and claims the benefit of foreign priority applications filed in Japan on Oct. 18,2019, as Application No. 2019-191411 and on Oct. 25, 2019, as Application No. 2019-194093.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof. One embodiment of the present invention relates particularly to a secondary battery using a sputtering method.

Note that electronic devices in this specification generally mean devices including power storage devices, and electro-optical devices including power storage devices, information terminal devices including power storage devices, and the like are all electronic devices.

Note that in this specification, a power storage device refers to every element and device having a function of storing power. For example, a power storage device (also referred to as a secondary battery) such as a lithium-ion secondary battery, a lithium-ion capacitor, and an electric double layer capacitor are included.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers, portable music players, digital cameras, medical equipment, next-generation clean energy vehicles such as hybrid electric vehicles (EV), electric vehicles (EV), and plug-in hybrid electric vehicles (PHV), and the like, and the lithium-ion secondary batteries are essential as rechargeable energy supply sources for today's information society.

Electric vehicles (EV) are vehicles in which only an electric motor is used for a driving portion, and there are also hybrid electric vehicles having both an internal-combustion engine such as an engine and an electric motor. A plurality of secondary batteries used in vehicles are provided as a battery pack, and a plurality of battery packs are provided on the lower portion of a vehicle.

As described above, lithium-ion secondary batteries have been used for a variety of purposes in various fields. The performance required for lithium-ion secondary batteries includes high energy density, excellent cycle performance, and safety in a variety of operation environments.

A lithium ion secondary battery using liquid such as an organic solvent as a transmission medium of lithium ions serving as carrier ions is widely used. Widely-used lithium-ion secondary batteries generally use a nonaqueous electrolyte (also referred to as a nonaqueous electrolyte solution or simply an electrolyte solution) that contains an organic solvent such as ethylene carbonate, propylene carbonate, fluorinated cyclic ester, fluorinated acyclic ester, fluorinated cyclic ether, or fluorinated acyclic ether and a lithium salt containing lithium ions. However, a secondary battery using liquid has problems such as the operable temperature range, a decomposition reaction of an electrolyte solution due to a potential to be used, and liquid leakage to the outside of the secondary battery, owing to the use of liquid. For example, an organic solvent has volatility and a low flash point; thus, when the organic solvent is used in a lithium-ion secondary battery, an increase in the internal temperature of the lithium-ion secondary battery due to an internal short circuit, overcharging, or the like might cause the lithium-ion secondary battery to explode or catch fire. In addition, some kinds of organic solvent produce a hydrofluoric acid by a hydrolysis reaction; this hydrofluoric acid corrodes metal, which causes a concern for the reliability of batteries.

As a secondary battery using no liquid, a power storage device using a solid electrolyte, which is called an all-solid-state battery, is known. Among all-solid-state batteries, a solid-state battery formed by deposition using a sputtering method is referred to as a thin-film secondary battery. Patent Document 1 discloses an example in which a lithium cobalt oxide film is formed over a positive electrode current collector by a sputtering method.

REFERENCE

Patent Document

[Patent Document 1] U.S. Pat. No. 8,404,001

SUMMARY OF THE INVENTION

Problems to be Solved by the Invention

There is room for improvements in a variety of aspects of secondary batteries, such as charge and discharge characteristics, cycle performance, reliability, safety, and costs. For example, regarding cycle performance, a crystal structure of a positive electrode active material may be broken as charge and discharge are repeated, which might lead to a reduction in charge and discharge capacity. Moreover, a side reaction may occur, for example, at the interface between a positive electrode active material and an electrolyte or the interface between a positive electrode active material and a positive electrode current collector, which might also lead to a reduction in charge and discharge capacity.

An object of one embodiment of the present invention is to provide a secondary battery in which a side reaction is less likely to occur, for example, at the interface between a positive electrode active material layer and a solid electrolyte layer or the interface between a negative electrode active material layer and the solid electrolyte layer even when charge and discharge are repeated. Another object is to provide a secondary battery with excellent charge and discharge cycle performance. Another object is to provide a secondary battery with high charge and discharge capacity. Another object is to provide a highly safe or reliable secondary battery.

Note that the description of these objects does not preclude the existence of other objects. One embodiment of the present invention does not have to achieve all these objects.

Other objects can be derived from the description of the specification, the drawings, and the claims.

Means for Solving the Problems

In one embodiment of the present invention, a buffer layer is provided between a positive electrode active material layer and a solid electrolyte layer in order to make a crystal structure less likely to be broken, suppress a side reaction, and improve cycle performance.

A structure of the invention disclosed in this specification is a secondary battery including a positive electrode active material layer, a buffer layer over the positive electrode active material layer, and a solid electrolyte layer over the buffer layer. The solid electrolyte layer contains a titanium compound. The positive electrode active material layer contains lithium cobalt oxide. The buffer layer contains a titanium compound.

Another structure of the invention is a secondary battery including a base film over a current collector, a positive electrode active material layer over the base film, a buffer layer over the positive electrode active material layer, and a solid electrolyte layer over the buffer layer. The solid electrolyte layer contains a titanium compound. The positive electrode active material layer contains lithium cobalt oxide. The buffer layer contains a titanium compound. The base film contains a titanium compound.

In the above structure, a crystal structure included in the base film and a crystal structure included in the positive electrode active material layer each have a plane where only anions are arranged. The thickness range of the base film is preferably greater than or equal to 50 nm, further preferably greater than or equal to 100 nm, still further preferably greater than or equal to 200 nm. In addition, the thickness of the base film is preferably less than or equal to 1 μm, further preferably less than or equal to 500 nm.

In each of the above structures, the positive electrode active material layer contains at least one of nickel, aluminum, magnesium, and fluorine.

In each of the above structures, a negative electrode active material layer is provided over the solid electrolyte layer.

In each of the above structures, the solid electrolyte layer is porous. The porous solid electrolyte layer is a solid having a large number of holes in the inside and is preferably formed by using a porous target and adjusting deposition conditions. Alternatively, the porous solid electrolyte layer may be formed by an evaporation method by adjusting deposition conditions. The shape of a large number of holes is not particularly limited and may be a spherical shape, an ellipsoidal shape, an irregular three-dimensional shape, and the like. A large number of holes in the solid electrolyte layer can serve as an ion conduction path. The holes in the porous solid electrolyte layer may be distributed uniformly or unevenly.

Examples of materials for the porous solid electrolyte layer include a titanium compound, $LiO_{0.35}La_{0.55}TiO_3$, $La_{(2/3-x)}Li_{(3x)}TiO_3$, $Li_3PO_4$, $LixPO_{(4-y)}Ny$, $LiNb_{(1-x)}Ta_{(x)}WO_6$, $Li_7La_3Zr_2O_{12}$, $Li_{(1+x)}Al_{(x)}Ti_{(2-x)}(PO_4)_3$, $Li_{(1+x)}Al_{(x)}Ge_{(2-x)}(PO_4)_3$, and $LiNbO_2$. Note that X>0 and Y>0.

When being used in a secondary battery using an electrolyte solution, the porous solid electrolyte layer has a function of a separator. Thus, when the porous solid electrolyte layer is used in a secondary battery using an electrolyte solution, a separator containing an organic resin does not have to be used. The porous solid electrolyte layer is effective in preventing a short circuit.

In each of the above structures, the base film, the positive electrode active material layer, the buffer layer, and the solid electrolyte layer are formed by a sputtering method.

In each of the above structures, the thickness of the buffer layer is greater than or equal to 1 nm and less than or equal to 100 nm, preferably greater than or equal to 5 nm and less than or equal to 40 nm.

Effect of the Invention

It is possible to achieve a secondary battery in which a side reaction is less likely to occur, for example, at the interface between a positive electrode active material layer and a solid electrolyte layer or the interface between a negative electrode active material layer and the solid electrolyte layer even when charge and discharge are repeated.

In addition, a positive electrode for a secondary battery in which a reduction in capacity due to charge and discharge cycles is inhibited can be provided. A secondary battery with excellent charge and discharge cycle performance can be provided. A secondary battery with high charge and discharge capacity can be provided. A highly safe or reliable secondary battery can be provided.

MODE FOR CARRYING OUT THE INVENTION

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the embodiments below.

Embodiment 1

A stack including a positive electrode for a secondary battery of one embodiment of the present invention and a solid electrolyte layer will be described with reference to FIG. 1.

Figure 1A:
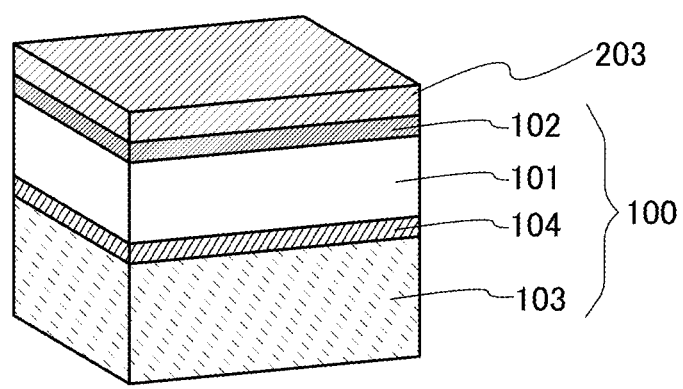
FIG. 1A to FIG. 1C are perspective views of a positive electrode of one embodiment of the present invention and a solid electrolyte layer.

FIG. 1A is a perspective view of an example of a stack including a secondary battery positive electrode 100 of one embodiment of the present invention and a solid electrolyte layer. The secondary battery positive electrode 100 includes a positive electrode current collector 103, a base film 104, a positive electrode active material layer 101, and a buffer layer 102. A solid electrolyte layer 203 is provided over the buffer layer 102.

The base film 104 is provided between the positive electrode current collector 103 and the positive electrode active material layer 101. The base film 104 has a function of increasing conductivity between the positive electrode current collector 103 and the positive electrode active material layer 101. Alternatively, the base film 104 has a function of inhibiting a side reaction such as oxidation of the positive electrode current collector 103 due to oxygen contained in the positive electrode active material layer 101 or the like or diffusion of a metal atom. Alternatively, the base film 104 has a function of stabilizing a crystal structure included in the positive electrode active material layer 101.

For the base film 104, a material having conductivity is preferably used. Moreover, a material that is likely to inhibit oxidation is preferably used. For example, it is possible to use a titanium compound such as titanium oxide, titanium nitride, titanium oxide in which nitrogen is substituted for part of oxygen, titanium nitride in which oxygen is substituted for part of nitrogen, or titanium oxynitride ($TiO_xN_y$, where $0<x<2$ and $0<y<1$). Titanium nitride is particularly preferable because it has high conductivity and has a high capability of inhibiting oxidation.

The buffer layer 102 is provided over the positive electrode active material layer 101. The buffer layer 102 has a function of inhibiting a side reaction between the positive electrode active material layer 101 and an electrolyte. Alternatively, the buffer layer 102 has a function of stabilizing a crystal structure included in the positive electrode active material layer 101.

For the buffer layer 102, a titanium compound is preferably used. For example, it is preferable to use titanium oxide, titanium nitride, titanium oxide in which nitrogen is substituted for part of oxygen, titanium nitride in which oxygen is substituted for part of nitrogen, or titanium oxynitride ($TiO_xN_y$, where $0<x<2$ and $0<y<1$). Titanium and oxygen are materials that can be included in the solid electrolyte layer 203. Therefore, titanium oxide is particularly preferable for the buffer layer 102.

The buffer layer 102 is formed by a sputtering method, so that a mixed layer may be formed at the interface between the positive electrode active material layer 101 and the buffer layer 102. When the mixed layer is formed, the boundary between the buffer layer 102 and the positive electrode active material layer 101 becomes unclear in some cases.

Examples of materials for the solid electrolyte layer 203 include $Li_{0.35}La_{0.55}TiO_3$, $La_{(2/3-x)}Li_{(3x)}TiO_3$, $Li_3PO_4$, $Li_xPO_{(4-y)}N_y$, $LiNb_{(1-x)}Ta_{(x)}WO_6$, $Li_7La_3Zr_2O_{12}$, $Li_{(1+x)}Al_{(x)}Ti_{(2-x)}(PO_4)_3$, $Li_{(1+x)}Al_{(x)}Ge_{(2-x)}(PO_4)_3$, and $LiNbO_2$. Note that $X>0$ and $Y>0$. As a deposition method, a sputtering method, an evaporation method, or the like can be used.

A compound containing titanium is preferably used for the solid electrolyte layer 203. Since the buffer layer 102 contains titanium, a secondary battery can be easily manufactured when a material containing titanium is also used for the solid electrolyte layer 203.

The solid electrolyte layer 203 may have a stacked-layer structure. In the case of employing a stacked-layer structure, a material to which nitrogen is added to lithium phosphate ($Li_3PO_4$) (the material is also referred to as $Li_3PO_{(4-z)}N_z$: LiPON) may be used in at least one layer included in the stack. Note that $Z>0$.

The solid electrolyte layer 203 is formed by a sputtering method, so that a mixed layer may be formed at the interface between the buffer layer 102 and the solid electrolyte layer 203.

The positive electrode active material layer 101 contains lithium, a transition metal M, and oxygen. In other words, the positive electrode active material layer 101 includes a composite oxide containing lithium and the transition metal M.

As the transition metal M contained in the positive electrode active material layer 101, a metal which together with lithium can form a layered rock-salt composite oxide that belongs to the space group R-3m is preferably used. As the transition metal M, one or more of manganese, cobalt, and nickel can be used, for example. That is, as the transition metal M contained in the positive electrode active material layer 101, only cobalt may be used; only nickel may be used; two types of metals of cobalt and manganese or cobalt and nickel may be used; or three types of metals of cobalt, manganese, and nickel may be used. In other words, the positive electrode active material layer 101 can include a composite oxide containing lithium and the transition metal M, such as lithium cobalt oxide, lithium nickel oxide, lithium cobalt oxide in which manganese is substituted for part of cobalt, lithium cobalt oxide in which nickel is substituted for part of cobalt, or lithium nickel-manganese-cobalt oxide.

In addition to the above, the positive electrode active material layer 101 may contain an element other than the transition metal M, such as magnesium, fluorine, or aluminum. Such elements further stabilize a crystal structure included in the positive electrode active material layer 101 in some cases. In other words, the positive electrode active material layer 101 can contain lithium cobalt oxide to which magnesium and fluorine are added, lithium nickel-cobalt oxide to which magnesium and fluorine are added, lithium cobalt-aluminum oxide to which magnesium and fluorine are added, lithium nickel-cobalt-aluminum oxide, lithium nickel-cobalt-aluminum oxide to which magnesium and fluorine are added, or the like.

When the positive electrode active material layer 101 contains lithium, cobalt, nickel, aluminum, magnesium, oxygen, and fluorine, given that the proportion of cobalt atoms included in the positive electrode active material layer 101 is 100, the proportion of nickel atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Given that the proportion of cobalt atoms included in the positive electrode active material layer 101 is 100, the proportion of aluminum atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Given that the proportion of cobalt atoms included in the positive electrode active material layer 101 is 100, the proportion of magnesium atoms is preferably greater than or equal to 0.1 and less than or equal to 6, further preferably greater than or equal to 0.3 and less than or equal to 3, for example. Given that the proportion of magnesium atoms included in the positive electrode active material layer 101 is 1, the proportion of fluorine atoms is preferably greater than or equal to 2 and less than or equal to 3.9, for example.

When nickel, aluminum, and magnesium are contained at the above concentrations, a stable crystal structure can be maintained even if the particle diameter is small or charge and discharge are repeated at high voltage. Thus, the positive electrode active material layer 101 can have high capacity and excellent charge and discharge performance.

The molar concentration of cobalt, nickel, aluminum, and magnesium can be measured by inductively coupled plasma mass spectrometry (ICP-MS), for example. The molar concentration of fluorine can be measured by glow discharge mass spectrometry (GD-MS), for example.

Ab Initio Calculations

Here, the results of calculating a crystal structure at the interface between the positive electrode active material layer 101 and the base film 104 in the case where lithium cobalt oxide is used for the positive electrode active material layer 101 will be described with reference to FIG. 2.

Figure 2A:
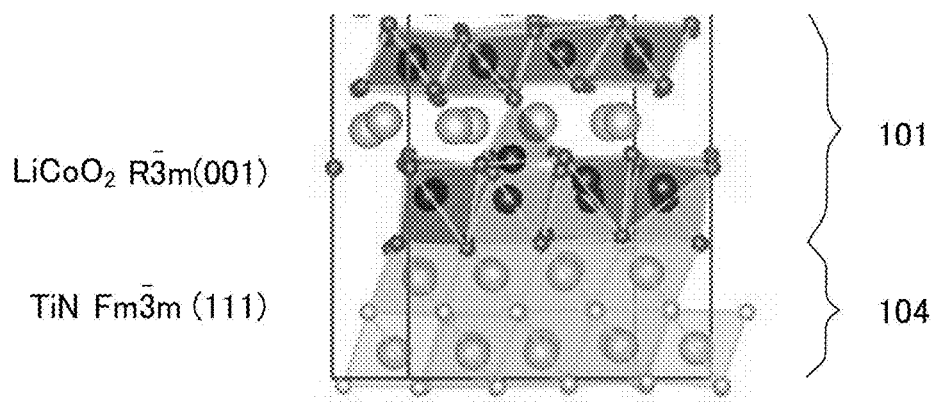
FIG. 2A and FIG. 2B are diagrams each illustrating crystal structures included in a positive electrode of one embodiment of the present invention.

FIG. 2A shows the case where titanium nitride is used for the base film 104. The calculation was performed given that titanium nitride has a rock-salt crystal structure that belongs to the space group Fm-3m and lithium cobalt oxide has a layered rock-salt crystal structure that belongs to the space group R-3m. The base film 104 and the positive electrode active material layer 101 are stacked such that the (111) plane of titanium nitride and the (001) plane of lithium cobalt oxide are parallel to each other.

Figure 2B:
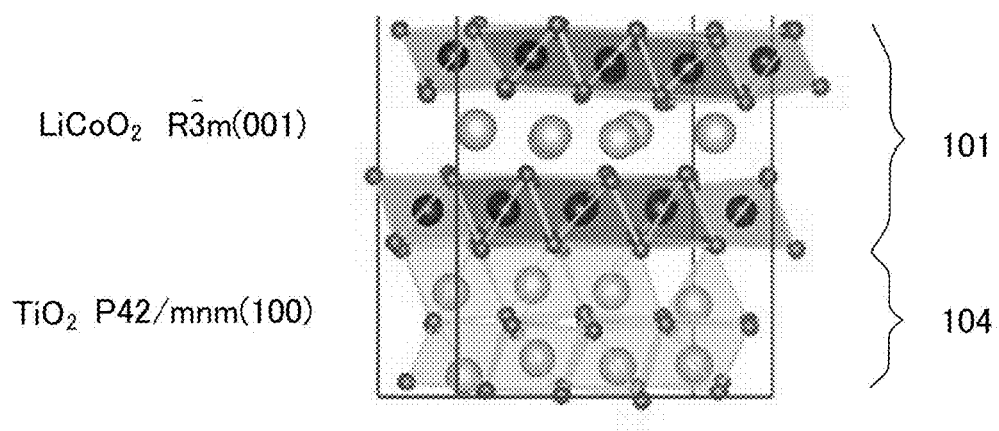
Figure 2B:
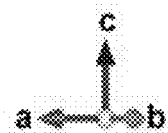

FIG. 2B shows the case where titanium oxide is used for the base film 104. The calculation was performed given that titanium oxide has a rutile crystal structure that belongs to the space group P42/mnm and lithium cobalt oxide has a layered rock-salt crystal structure that belongs to the space group R-3m. The base film 104 and the positive electrode active material layer 101 are stacked such that the (100) plane of titanium oxide and the (001) plane of lithium cobalt oxide are parallel to each other.

FIG. 2A and FIG. 2B selectively show the interface between the positive electrode active material layer 101 and the base film 104. Other calculation conditions are listed in Table 1.

TABLE 1

| Software | VASP | |
|---|---|---|
| Functional | GGA + U (DFT-D2) | |
| Pseudopotential | PAW | |
| Cutoff energy (eV) | 600 | |
| U potential | Co | 4.91 |
| Number of atoms | TiN for base film | Li 48, Co 48, O 96, Ti 32, N 32 |
|  | $TiO_2$ for base film | Li 48, Co 48, O 128, Ti 16 |
| k-points | $1 \times 1 \times 1$ | |
| MD temperature | 600 K | |
| Time step size | 2 fs | |

In the case of FIG. 2A in which titanium nitride (shown as TiN in the table) is used for the base film 104, the Ti—O distance was 2.03 Å, the Ti—N distance was 1.93 Å, the Co—O distance was 2.25 Å, and the Co—N distance was 2.21 Å. Note that 1 Å=$10^{-10}$ m.

In the rock-salt crystal structure that belongs to the space group Fm-3m, a plane where only anions are arranged exists parallel to the (111) plane. In titanium nitride, only nitrogen atoms are arranged on a plane parallel to the (111) plane. In the layered rock-salt crystal structure that belongs to the space group R-3m, a plane where only anions are arranged exists parallel to the (001) plane. In lithium cobalt oxide, only oxygen atoms are arranged on a plane parallel to the (001) plane.

When the (111) plane of titanium nitride and the (001) plane of lithium cobalt oxide are parallel to each other, planes where only anions are arranged are parallel to each other in these materials, so that the crystal structure is likely to become stable.

The rock-salt crystal structure that belongs to the space group Fm-3m and the layered rock-salt crystal structure that belongs to the space group R-3m can each be regarded as a crystal structure in which cations and anions are alternately arranged. Thus, when lithium cobalt oxide having a layered rock-salt crystal structure is stacked over titanium nitride having a rock-salt crystal structure, orientation of crystals in the base film 104 and orientation of crystals in the positive electrode active material layer 101 are likely to be substantially aligned with each other.

Meanwhile, in the case of FIG. 2B in which titanium oxide (shown as $TiO_2$ in the table) is used for the base film 104, the Ti—O distance was 2.15 Å and the Co—O distance was 1.91 Å. In titanium oxide having a rutile crystal structure, oxygen atoms are not arranged on a plane parallel to the (100) plane. Therefore, there is a possibility that titanium oxide has a lower capability of stabilizing a layered rock-salt crystal structure than titanium nitride.

In view of the above, titanium nitride is particularly preferable for the base film 104 when lithium cobalt oxide having a layered rock-salt crystal structure is used for the positive electrode active material layer 101.

Figure 1B:
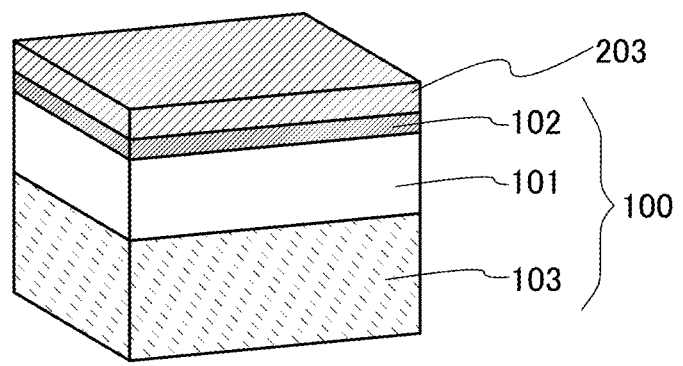

FIG. 1B is a perspective view of another example of the stack including the secondary battery positive electrode 100 of one embodiment of the present invention and the solid electrolyte layer 203. The secondary battery positive electrode 100 illustrated in FIG. 1B includes the positive electrode current collector 103, the positive electrode active material layer 101, and the buffer layer 102. In this manner, the secondary battery positive electrode 100 does not always necessarily include the base film 104. Even without including the base film 104, the secondary battery can sometimes have adequately high cycle performance by including the buffer layer 102.

Figure 1C:
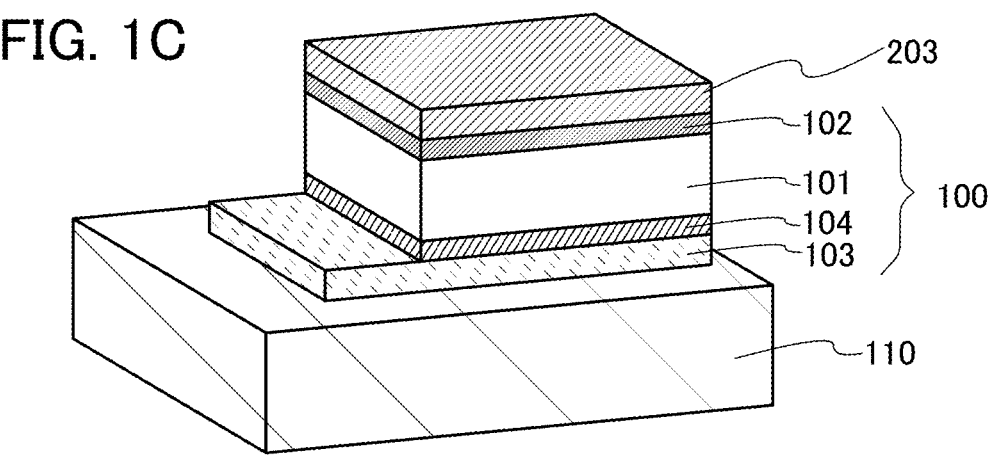

Although FIG. 1A and FIG. 1B show the positive electrode in which the positive electrode current collector 103 serves as both a current collector and a substrate, one embodiment of the present invention is not limited thereto. FIG. 1C is a perspective view of another example of the secondary battery positive electrode 100. As illustrated in FIG. 1C, the secondary battery positive electrode 100 may be formed by depositing the positive electrode current collector 103, the base film 104, the positive electrode active material layer 101, and the buffer layer 102 over a substrate 110.

This embodiment can be implemented in appropriate combination with the other embodiments.

Embodiment 2

In this embodiment, a secondary battery including the stack of the secondary battery positive electrode 100 and the solid electrolyte layer 203, described in Embodiment 1, and a method for manufacturing the secondary battery will be described with reference to FIG. 3 to FIG. 6.

Structure of Secondary Battery

Figure 3A:
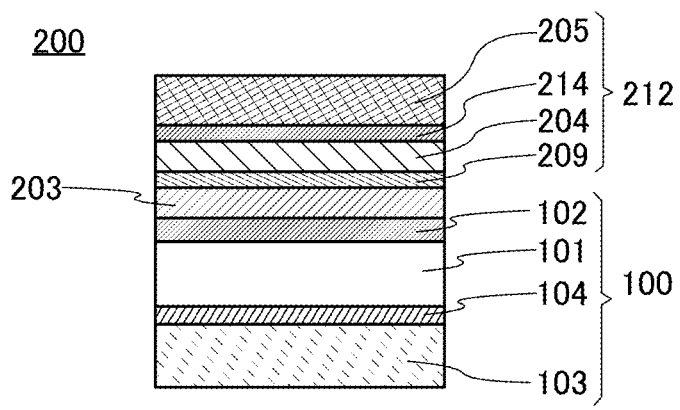
FIG. 3A to FIG. 3C are diagrams each illustrating a stacked-layer structure of a secondary battery of one embodiment of the present invention.

FIG. 3A illustrates an example of a stacked-layer structure of a secondary battery 200 including the secondary battery positive electrode 100 of one embodiment of the present invention.

The secondary battery 200 is a thin-film battery and includes the secondary battery positive electrode 100 and the solid electrolyte layer 203, which are described in the foregoing embodiment, and a negative electrode 212 is formed over the solid electrolyte layer 203. The negative electrode 212 includes a negative electrode current collector 205 and a negative electrode active material layer 204. As illustrated in FIG. 3A, the negative electrode 212 preferably includes a base film 214 and a buffer layer 209.

The base film 214 is provided between the negative electrode current collector 205 and the negative electrode active material layer 204. The base film 214 has a function of increasing conductivity between the negative electrode current collector 205 and the negative electrode active material layer 204. Alternatively, the base film 214 has a function of suppressing excessive expansion of the negative electrode active material layer. Alternatively, the base film 214 has a function of inhibiting a side reaction between the negative electrode current collector 205 and the negative electrode active material layer 204.

For the base film 214, it is preferable to use a material having conductivity. It is preferable to use a material capable of suppressing excessive expansion of the negative electrode active material layer. It is preferable to use a material that is likely to inhibit a side reaction. For example, it is preferable to use a titanium compound such as titanium oxide, titanium nitride, titanium oxide in which nitrogen is substituted for part of oxygen, titanium nitride in which oxygen is substituted for part of nitrogen, or titanium oxynitride ($TiO_xN_y$, where $0<x<2$ and $0<y<1$). Titanium nitride is particularly preferable because it has high conductivity and has a high capability of inhibiting a side reaction.

The buffer layer 209 is provided between the negative electrode active material layer 204 and the solid electrolyte layer 203. The buffer layer 209 has a function of inhibiting a side reaction between the negative electrode active material layer 204 and the solid electrolyte layer 203.

The buffer layer 209 is formed by a sputtering method, so that a mixed layer may be formed at the interface between the solid electrolyte layer 203 and the buffer layer 209.

Titanium or a titanium compound is preferably used for the buffer layer 209. As the titanium compound, it is preferable to use titanium oxide, titanium nitride, titanium oxide in which nitrogen is substituted for part of oxygen, titanium nitride in which oxygen is substituted for part of nitrogen, or titanium oxynitride ($TiO_xN_y$, where $0<x<2$ and $0<y<1$), for example. Since titanium is included in the solid electrolyte layer 203, titanium and the titanium compound are particularly preferable for the buffer layer 209.

For the negative electrode active material layer 204, silicon, carbon, titanium oxide, vanadium oxide, indium oxide, zinc oxide, tin oxide, nickel oxide, or the like can be used. A material that is alloyed with Li, such as tin, gallium, or aluminum can be used. Alternatively, an oxide of such a metal that is alloyed with Li may be used. A lithium titanium oxide ($Li_4Ti_5O_{12}$, $LiTi_2O_4$, or the like) may be used; in particular, a material containing silicon and oxygen (also referred to as a SiOx film) is preferable. A Li metal may also be used for the negative electrode active material layer 204.

The solid electrolyte layer 203 is provided between the secondary battery positive electrode 100 and the negative electrode 212.

Figure 3B:
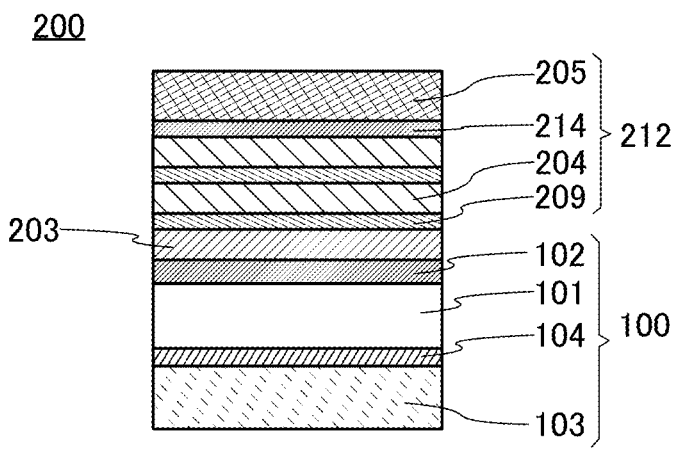

As illustrated in FIG. 3B, the secondary battery 200 may include the negative electrode 212 in which a plurality of negative electrode active material layers 204 and a plurality of buffer layers 209 are stacked. When a plurality of negative electrode active material layers 204 and a plurality of buffer layers 209 are stacked, excessive expansion of the negative electrode 212 can be suppressed while the capacity is increased. In this case, the buffer layer 209 in contact with the solid electrolyte layer 203 and the buffer layer 209 sandwiched between the negative electrode active material layers 204 may be formed using the same material or different materials. For example, titanium oxide may be used for the buffer layer 209 in contact with the solid electrolyte layer 203, and titanium nitride may be used for the buffer layer 209 sandwiched between the negative electrode active material layers 204. In the negative electrode 212 in which a plurality of negative electrode active material layers 204 and a plurality of buffer layers 209 are stacked, the thickness range of each buffer layer 209 is from 5 nm to 40 nm, and the thickness range of each negative electrode active material layer 204 is from 20 nm to 100 nm.

A mixed layer may be formed at the interface between the buffer layer 209 and the negative electrode active material layer 204.

Figure 3C:
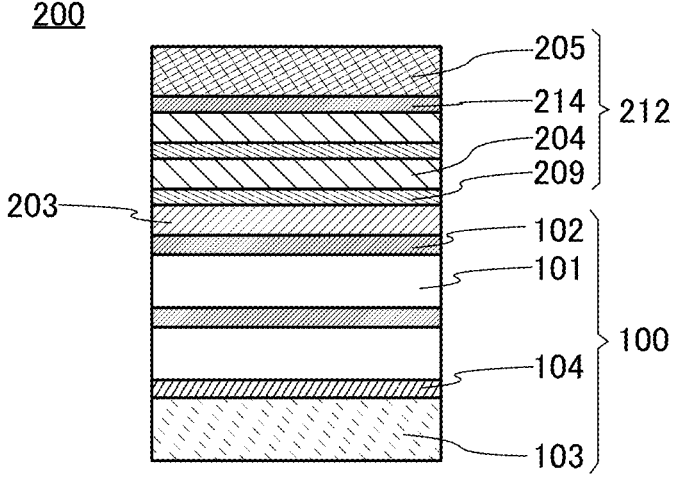

As illustrated in FIG. 3C, the secondary battery 200 may include the secondary battery positive electrode 100 in which a plurality of positive electrode active material layers 101 and a plurality of buffer layers 102 are stacked. When a plurality of positive electrode active material layers 101 and a plurality of buffer layers 102 are stacked, collapse of a crystal structure included in the positive electrode active material layers 101 can be suppressed while the capacity is increased. In this case, the buffer layer 102 in contact with the solid electrolyte layer 203 and the buffer layer 102 sandwiched between the positive electrode active material layers 101 may be formed using the same material or different materials. For example, titanium oxide may be used for the buffer layer 102 in contact with the solid electrolyte layer 203, and titanium nitride may be used for the buffer layer 102 sandwiched between the positive electrode active material layers 101.

Figure 4A:
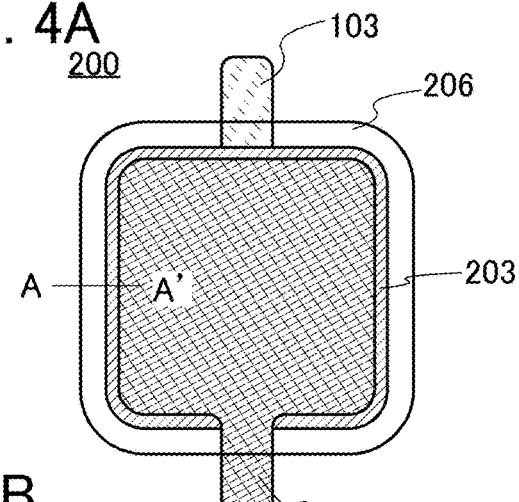
FIG. 4A is a top view illustrating one embodiment of the present invention.
Figure 4B:
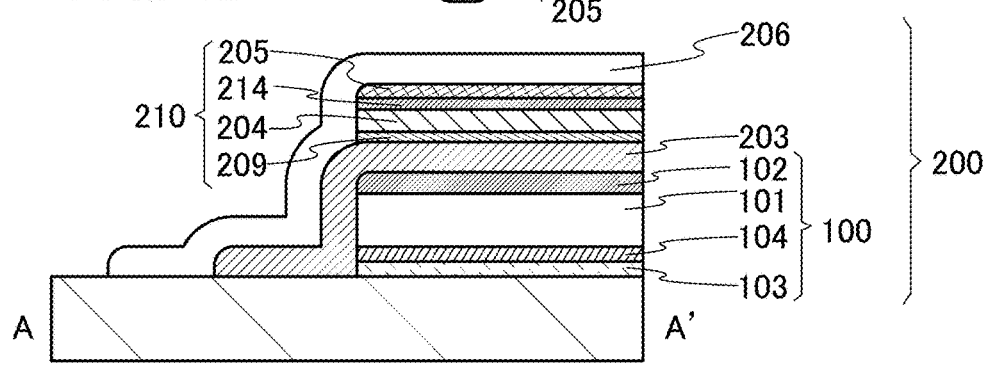
FIG. 4B to FIG. 4D are cross-sectional views each illustrating one embodiment of the present invention.

FIG. 4A and FIG. 4B illustrate a more specific example of the secondary battery 200 of one embodiment of the present invention. The secondary battery 200 formed over the substrate 110 is described here.

FIG. 4A is a top view, and FIG. 4B is a cross-sectional view taken along the line A-A' in FIG. 4A. The secondary battery 200 is a thin-film battery in which the stack including the secondary battery positive electrode 100 and the solid electrolyte layer 203, described in the foregoing embodiment, is formed over the substrate 110 and a negative electrode 210 is formed over the solid electrolyte layer 203, as illustrated in FIG. 4B. The negative electrode 210 includes the negative electrode current collector 205, the base film 214, the negative electrode active material layer 204, and the buffer layer 209.

In the secondary battery 200, a protective layer 206 is preferably formed over the secondary battery positive electrode 100, the solid electrolyte layer 203, and the negative electrode 210.

Films for forming these layers can be formed using metal masks. The positive electrode current collector 103, the base film 104, the positive electrode active material layer 101, the buffer layer 102, the solid electrolyte layer 203, the buffer layer 209, the negative electrode active material layer 204, the base film 214, and the negative electrode current collector 205 can be selectively formed by a sputtering method. Furthermore, the solid electrolyte layer 203 may be selectively formed using a metal mask.

As illustrated in FIG. 4A, part of the negative electrode current collector 205 is exposed to form a negative electrode terminal portion. In addition, part of the positive electrode current collector 103 is exposed to form a positive electrode terminal portion. A region other than the negative electrode terminal portion and the positive electrode terminal portion is covered with the protection layer 206.

In FIG. 4A and FIG. 4B, the positive electrode current collector 103, the base film 104, the positive electrode active material layer 101, and the buffer layer 102 are provided. The structure where the solid electrolyte layer 203, the negative electrode active material layer 204, and the negative electrode current collector 205 are stacked in this order over the secondary battery positive electrode 100 is described; however, one embodiment of the present invention is not limited thereto.

Figure 4C:
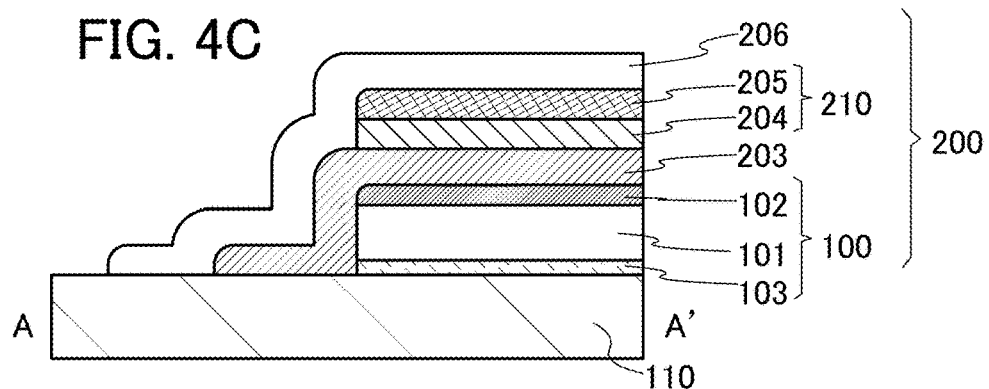

As illustrated in FIG. 4C, the secondary battery 200 may include the secondary battery positive electrode 100 that does not include the base film 104 between the positive electrode current collector 103 and the positive electrode active material layer 101. Moreover, the secondary battery 200 may include the negative electrode 210 that does not include the base film 214 and the buffer layer 209.

Figure 4D:
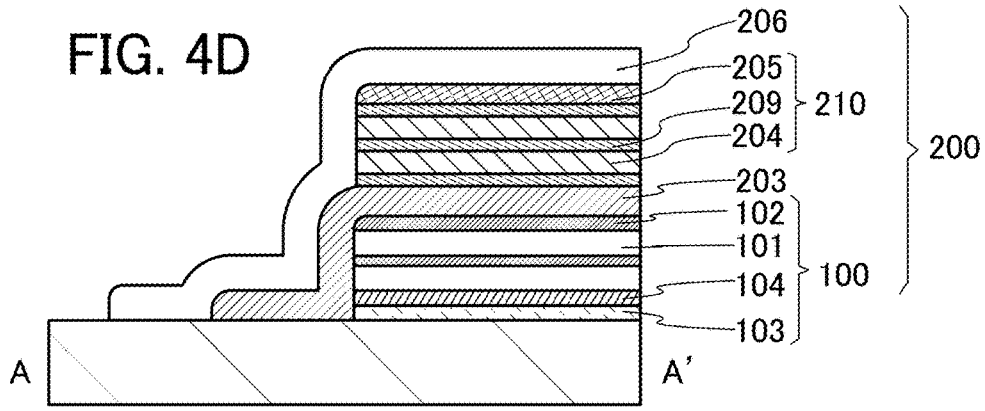

Both the positive electrode and the negative electrode included in the secondary battery of one embodiment of the present invention may have a stacked-layer structure of active material layers and buffer layers. As illustrated in FIG. 4D, the secondary battery 200 may include the negative electrode 210 in which a plurality of negative electrode active material layers 204 and a plurality of buffer layers 209 are stacked. Moreover, the secondary battery 200 may include the secondary battery positive electrode 100 in which a plurality of positive electrode active material layers 101 and a plurality of buffer layers 102 are stacked.

Figure 5A:
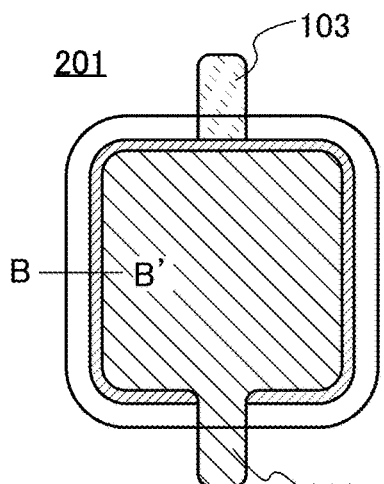
FIG. 5A and FIG. 5C are top views each illustrating one embodiment of the present invention.
Figure 5B:
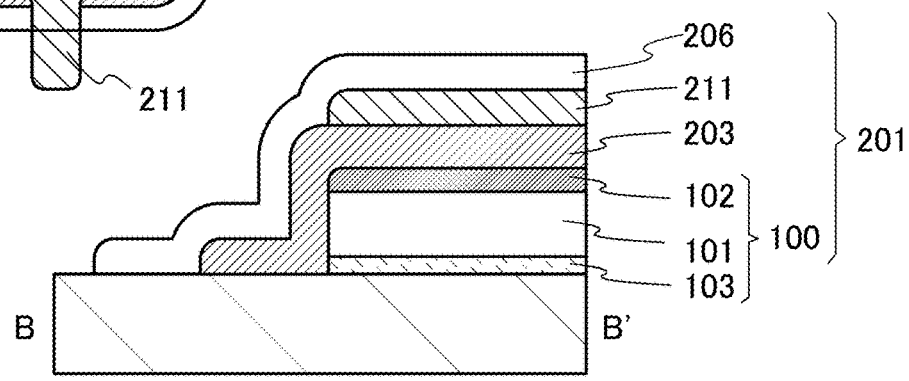
FIG. 5B and FIG. 5D are cross-sectional views each illustrating one embodiment of the present invention.

As illustrated in FIG. 5A and FIG. 5B, the secondary battery of one embodiment of the present invention may be a secondary battery 201 including a negative electrode 211 that serves as a negative electrode current collector layer and a negative electrode active material layer. FIG. 5A is a top view of the secondary battery 201, and FIG. 5B is a cross-sectional view taken along the line B-B' in FIG. 5A. With the negative electrode 211 serving as a negative electrode current collector layer and a negative electrode active material layer, the secondary battery can have a simplified process and high productivity. In addition, the secondary battery can have high energy density.

Figure 5C:
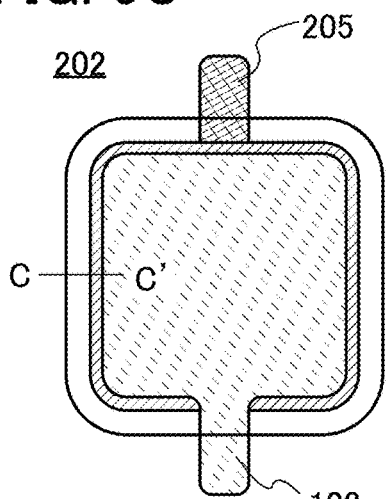
Figure 5D:
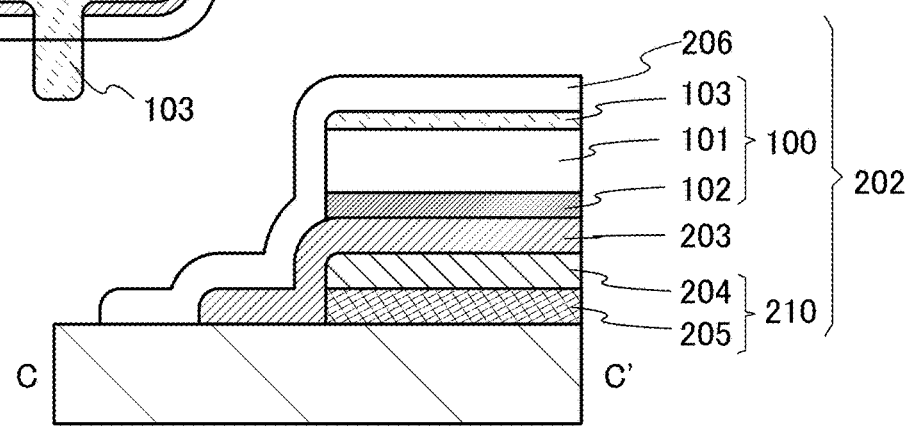

As illustrated in FIG. 5C and FIG. 5D, the secondary battery of one embodiment of the present invention may be a secondary battery 202 in which the solid electrolyte layer 203 and the secondary battery positive electrode 100 are stacked over the negative electrode 210. FIG. 5C is a top view of the secondary battery 202, and FIG. 5D is a cross-sectional view taken along the line C-C' in FIG. 5C.

Manufacturing Method

Figure 6:
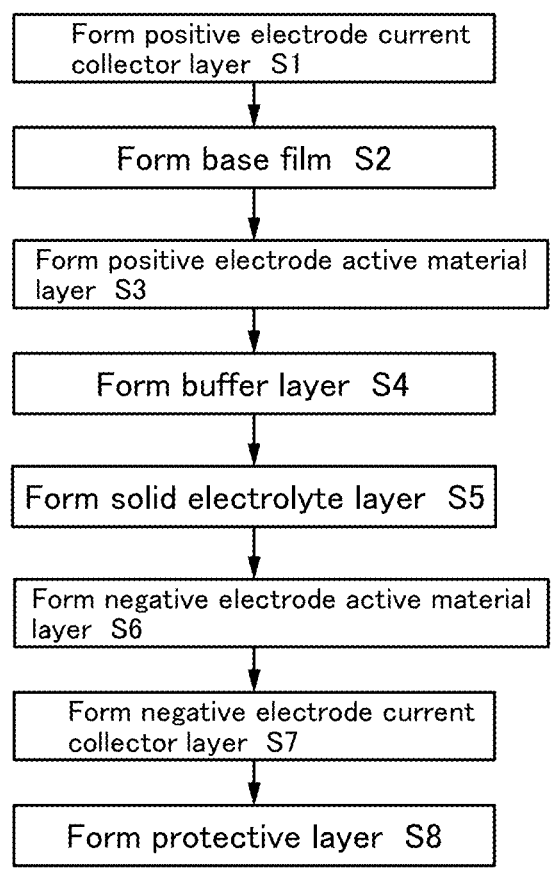
FIG. 6 is a flow chart showing a manufacturing procedure of a secondary battery of one embodiment of the present invention.

Next, an example of a procedure of a method for manufacturing the secondary battery 200 illustrated in FIG. 4A and FIG. 4B will be described with reference to FIG. 6.

First, the positive electrode current collector 103 is formed over the substrate 110 (S1). As a deposition method, a sputtering method, an evaporation method, or the like can be used. A substrate having conductivity may be used as the current collector. For the positive electrode current collector 103, it is possible to use a material having high conductivity, for example, a metal such as gold, platinum, aluminum, titanium, copper, magnesium, iron, cobalt, nickel, zinc, germanium, indium, silver, or palladium or an alloy thereof. It is also possible to use aluminum to which an element that improves heat resistance, such as silicon, titanium, neodymium, scandium, or molybdenum, is added. Alternatively, the positive electrode current collector 103 may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel.

As the substrate 110, a ceramic substrate, a glass substrate, a resin substrate, a silicon substrate, a metal substrate, or the like can be used. When a material having flexibility is used for the substrate 110, a flexible thin-film secondary battery can be manufactured.

The positive electrode current collector 103 using a material having high conductivity can serve as both a substrate and a positive electrode current collector. In this case, a metal substrate of titanium or copper is preferably used, for example. In the case where the base film 104 is provided, the base film 104 inhibits oxidation of the positive electrode current collector 103 due to oxygen contained in the positive electrode active material layer 101 or the like and diffusion of a metal atom. Accordingly, a material that is easily oxidized or a material including a metal atom that is easily diffused can be used for the positive electrode current collector 103.

Next, the base film 104 is formed (S2). As a deposition method for the base film 104, a sputtering method, an evaporation method, or the like can be used. For example, in the case where titanium nitride is used for the base film 104, titanium nitride can be deposited by a reactive sputtering method using a titanium target and a nitrogen gas.

Then, the positive electrode active material layer 101 is formed (S3). The positive electrode active material layer 101 can be formed by a sputtering method using a sputtering target that includes, as its main component, an oxide containing lithium and one or more of manganese, cobalt, and nickel, for example. It is possible to use, for example, a sputtering target including a lithium cobalt oxide ($LiCoO_2$, $LiCo_2O_4$, or the like) as its main component, a sputtering target including a lithium manganese oxide ($LiMnO_2$, $LiMn_2O_4$, or the like) as its main component, or a sputtering target including a lithium nickel oxide ($LiNiO_2$, $LiNi_2O_4$, or the like) as its main component. Alternatively, the positive electrode active material layer 101 may be formed by a vacuum evaporation method. The thickness range of the positive electrode active material layer 101 is from 100 nm to 1 μm.

In a sputtering method, with use of a metal mask, film deposition can be selectively performed. Alternatively, the positive electrode active material layer 101 may be patterned by being selectively removed by dry etching or wet etching using a resist mask or the like.

To form the positive electrode active material layer 101 including magnesium, fluorine, aluminum, or the like, the positive electrode active material layer 101 may be formed using a sputtering target that includes magnesium, fluorine, aluminum, or the like in addition to lithium and one or more of manganese, cobalt, and nickel. Alternatively, film deposition may be performed using a sputtering target that includes, as its main component, an oxide containing lithium and one or more of manganese, cobalt, and nickel; after that, magnesium, fluorine, aluminum, or the like may be deposited by a vacuum evaporation method; then, annealing may be performed.

Subsequently, the buffer layer 102 is formed over the positive electrode active material layer 101 (S4). As a deposition method for the buffer layer 102, a sputtering method, an evaporation method, or the like can be used. For example, in the case where titanium oxide is used for the buffer layer 102, titanium oxide can be deposited by a reactive sputtering method using a titanium target and an oxygen gas. Titanium oxide can also be deposited by sputtering of a titanium oxide target.

The positive electrode active material layer 101 and the buffer layer 102 are preferably formed at a high temperature (500° C. or higher). The secondary battery positive electrode 100 with higher crystallinity can be manufactured.

Next, the solid electrolyte layer 203 is formed over the positive electrode active material layer 101 (S5).

A compound containing titanium is preferably used for the solid electrolyte layer 203. Since the buffer layer 102 contains titanium, the secondary battery can be easily manufactured when a material containing titanium is also used for the solid electrolyte layer 203. As a deposition method, a sputtering method, an evaporation method, or the like can be used. The thickness of the solid electrolyte layer 203 is greater than or equal to 100 nm and less than or equal to 5 μm.

Then, the negative electrode active material layer 204 is formed over the solid electrolyte layer 203 (S6). As a deposition method, a sputtering method, an evaporation method, or the like can be used.

Next, the negative electrode current collector 205 is formed over the negative electrode active material layer 204 (S7). As a material of the negative electrode current collector 205, one or more kinds of conductive materials selected from Al, Ti, Cu, Au, Cr, W, Mo, Ni, Ag, and the like are used. As a deposition method, a sputtering method, an evaporation method, or the like can be used. In a sputtering method, with use of a metal mask, film deposition can be selectively performed. A conductive film may be patterned by being selectively removed by dry etching or wet etching using a resist mask or the like.

In the case where the positive electrode current collector 103 and the negative electrode current collector 205 are formed by a sputtering method, at least one of the positive electrode active material layer 101 and the negative electrode active material layer 204 is preferably formed by a sputtering method. A sputtering apparatus is capable of successive film deposition in one chamber or using a plurality of chambers and can also be a multi-chamber manufacturing apparatus or an in-line manufacturing apparatus. A sputtering method is a manufacturing method that uses a chamber and a sputtering target and is suitable for mass production. In addition, a sputtering method enables thin formation and thus excels in film deposition properties.

Then, the protective layer 206 is preferably formed over the secondary battery positive electrode 100, the solid electrolyte layer 203, and the negative electrode 210 (S8). For the protective layer 206, it is possible to use a metal oxide containing one kind or two or more kinds selected from hafnium, aluminum, gallium, yttrium, zirconium, tungsten, titanium, tantalum, nickel, germanium, neodymium, lanthanum, magnesium, and the like. It is also possible to use silicon nitride oxide, silicon nitride, or the like. The protective layer 206 can be formed by a sputtering method.

For film deposition of each layer described in this embodiment, a gas phase method (a vacuum evaporation method, a thermal spraying method, a pulsed laser deposition method (PLD method), an ion plating method, a cold spray method, or an aerosol deposition method) can also be used without limitation to a sputtering method. Note that an aerosol deposition (AD) method is a method in which film deposition is performed without heating a substrate. The aerosol means microparticles dispersed in a gas. Alternatively, a CVD method or an ALD (Atomic layer Deposition) method may be used.

Through the above-described steps, the secondary battery 200 of one embodiment of the present invention can be manufactured.

This embodiment can be implemented in appropriate combination with the other embodiments.

Embodiment 3

Secondary batteries can be connected in series in order to increase the output voltage of a thin-film secondary battery. Embodiment 2 shows the example of a secondary battery having one cell; this embodiment will show an example of manufacturing a thin-film secondary battery in which a plurality of cells are connected in series.

Figure 7A:
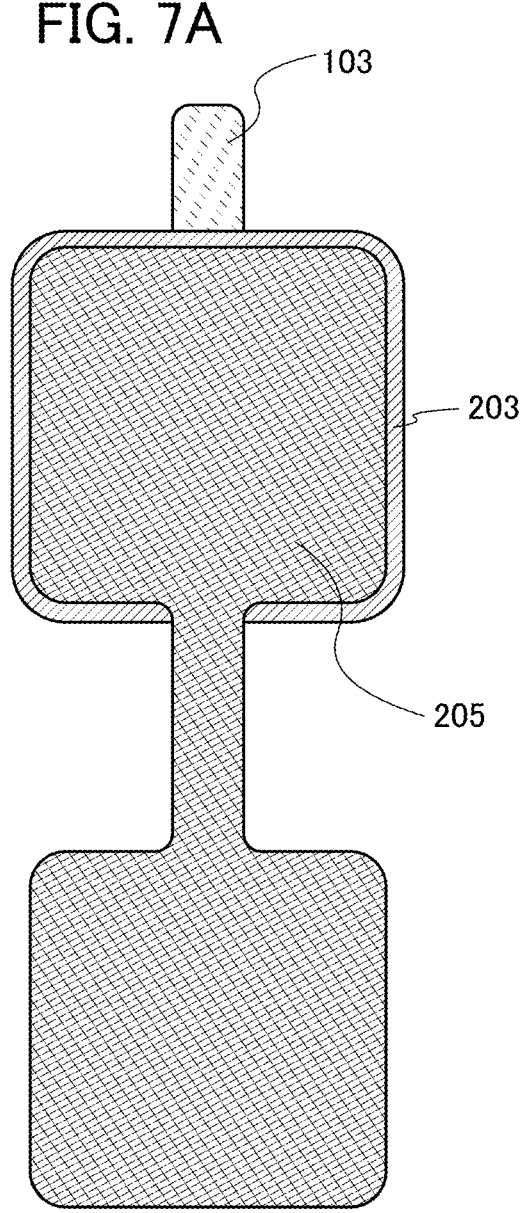
FIG. 7A and FIG. 7B are top views each illustrating one embodiment of the present invention.
Figure 7B:
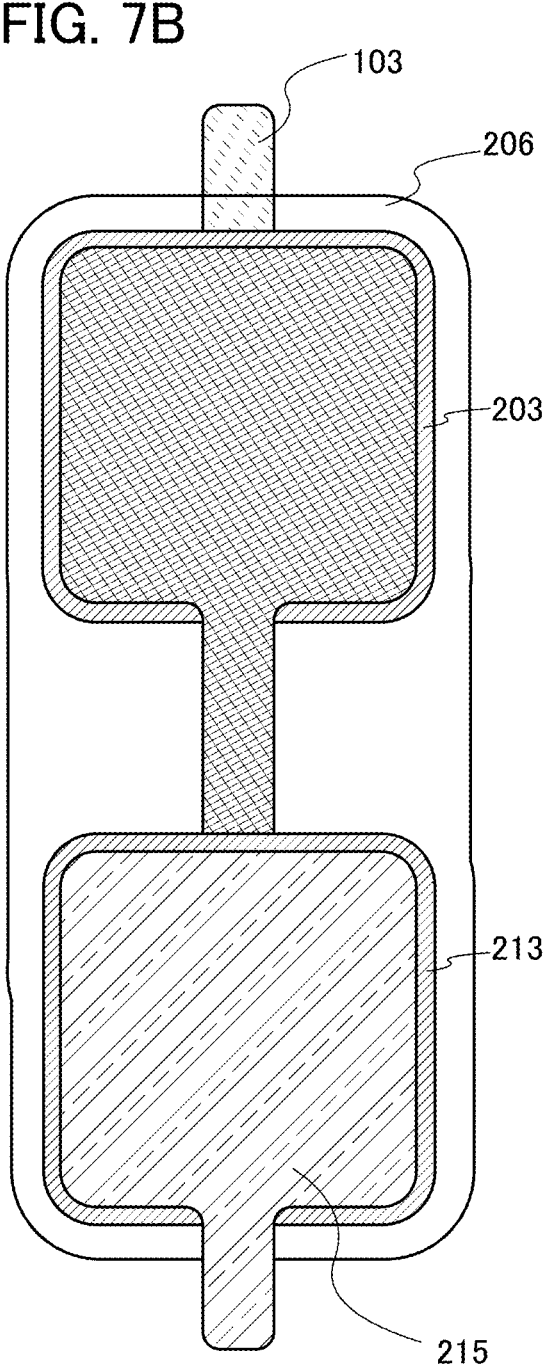

FIG. 7A is a top view right after formation of a first secondary battery, and FIG. 7B is a top view of two secondary batteries connected in series. In FIG. 7A and FIG. 7B, the same portions as the portions in FIG. 5A described in Embodiment 2 are denoted by the same reference numerals.

FIG. 7A illustrates the state right after formation of the negative electrode current collector 205. The shape of the top surface of the negative electrode current collector 205 is different from that in FIG. 5A. The negative electrode current collector 205 illustrated in FIG. 7A is partly in contact with a side surface of the solid electrolyte layer and is also in contact with an insulating surface of the substrate.

Then, as illustrated in FIG. 7B, a second negative electrode active material layer is formed over a region of the negative electrode current collector 205 that does not overlap the first negative electrode active material layer. Subsequently, a second solid electrolyte layer 213 is formed, and a second positive electrode active material layer and a second positive electrode current collector 215 are formed thereover. Finally, the protective layer 206 is formed.

FIG. 7B illustrates a structure in which two solid-state secondary batteries are arranged on a plane and connected in series.

This embodiment can be implemented in appropriate combination with the other embodiments.

Embodiment 4

To increase the output voltage or discharge capacity of a thin-film secondary battery, the secondary battery can be a multi-layer secondary battery in which a plurality of positive electrodes and a plurality of negative electrodes overlap to be stacked. Embodiment 2 shows the example of a secondary battery having a single-layer cell; this embodiment will show an example of a thin-film battery having multi-layer cells.

Figure 8:
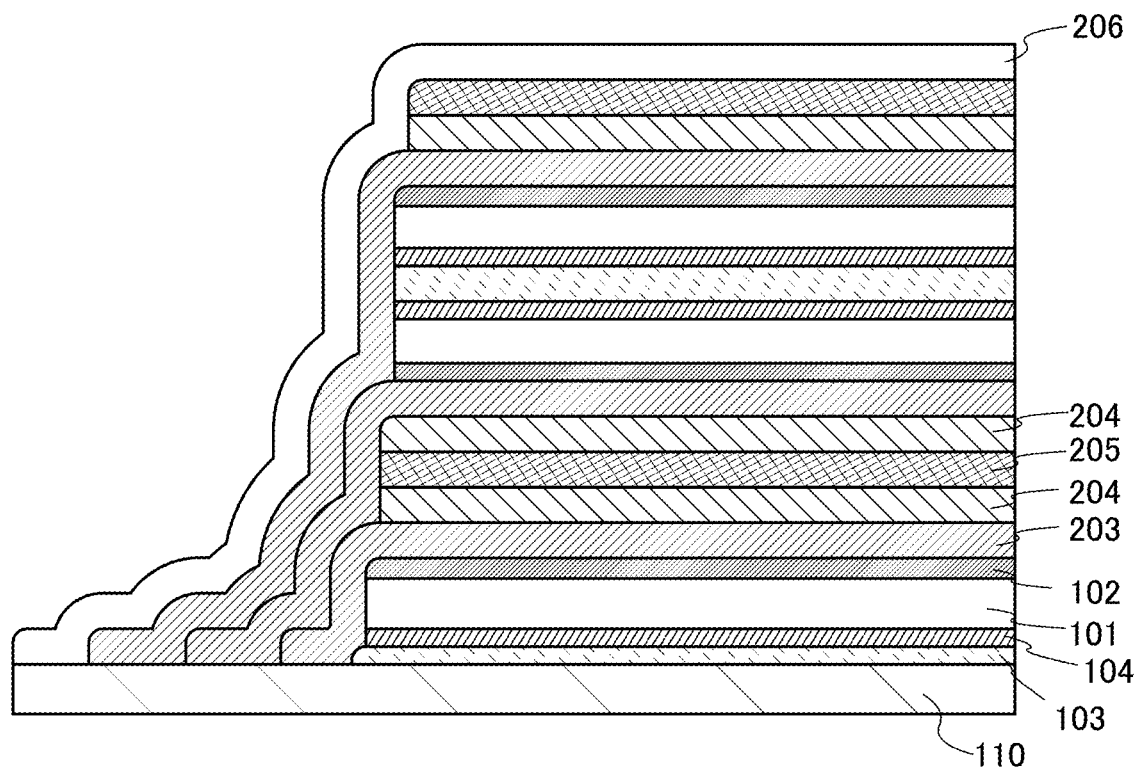
FIG. 8 is a cross-sectional view illustrating one embodiment of the present invention.

FIG. 8 illustrates an example of a cross section of a thin-film battery having three-layer cells. The first cell is formed in such a manner that the positive electrode current collector 103 is formed over the substrate 110, and the base film 104, the positive electrode active material layer 101, the buffer layer 102, the positive electrode active material layer 101, the solid electrolyte layer 203, the negative electrode active material layer 204, and the negative electrode current collector 205 are sequentially formed over the positive electrode current collector 103.

Furthermore, the second cell is formed in such a manner that a second negative electrode active material layer 204, a second solid electrolyte layer, a second buffer layer, a second positive electrode active material layer, a second base film, and a second positive electrode current collector layer are sequentially formed over the negative electrode current collector 205.

Moreover, the third cell is formed in such a manner that a third base film, a third positive electrode active material layer, a third buffer layer, a third solid electrolyte layer, a third negative electrode active material layer, and a third negative electrode current collector layer are sequentially formed over the second positive electrode current collector.

In FIG. 8, the protection layer 206 is formed last. The three-layer stack illustrated in FIG. 8 has a structure of series connection in order to increase the capacity but can be connected in parallel with an external wiring. Alternatively, series connection, parallel connection, or series-parallel connection can be selected with an external wiring.

Note that the solid electrolyte layer 203, the second solid electrolyte layer, and the third solid electrolyte layer are preferably formed using the same material, leading to a reduction in the manufacturing cost.

Figure 9:
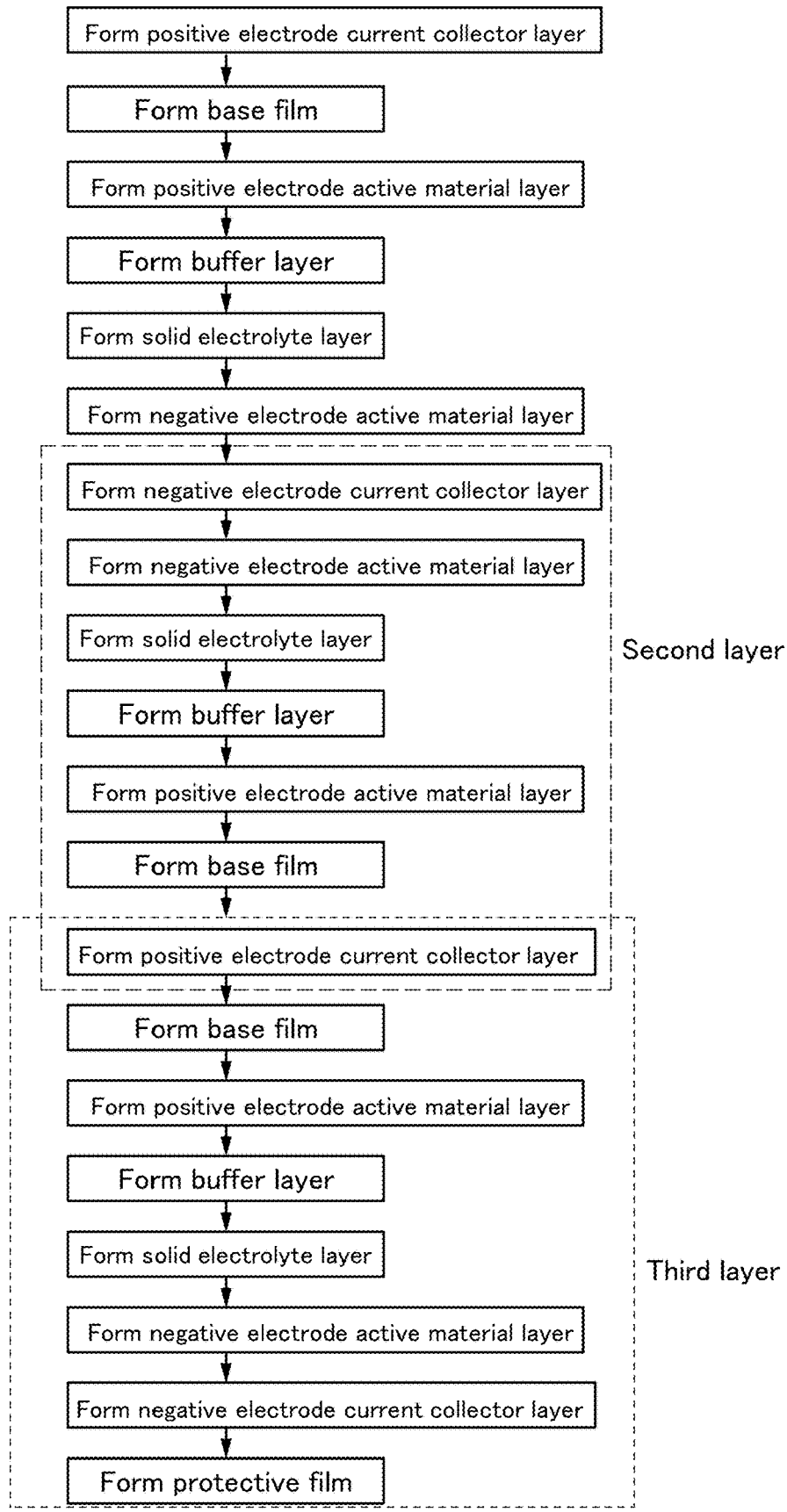
FIG. 9 is a flow chart showing a manufacturing procedure of a secondary battery of one embodiment of the present invention.

FIG. 9 shows an example of a manufacturing procedure for obtaining the structure illustrated in FIG. 8.

In FIG. 9, to reduce the number of manufacturing steps, it is preferable to use lithium cobalt oxide films for the positive electrode active material layers and to use titanium films for the positive electrode current collectors and the negative electrode current collectors (conductive layer). The use of the titanium film as a common electrode achieves three-layer stacked cells with a small number of components.

This embodiment can be implemented in appropriate combination with the other embodiments.

Embodiment 5

Figure 10:
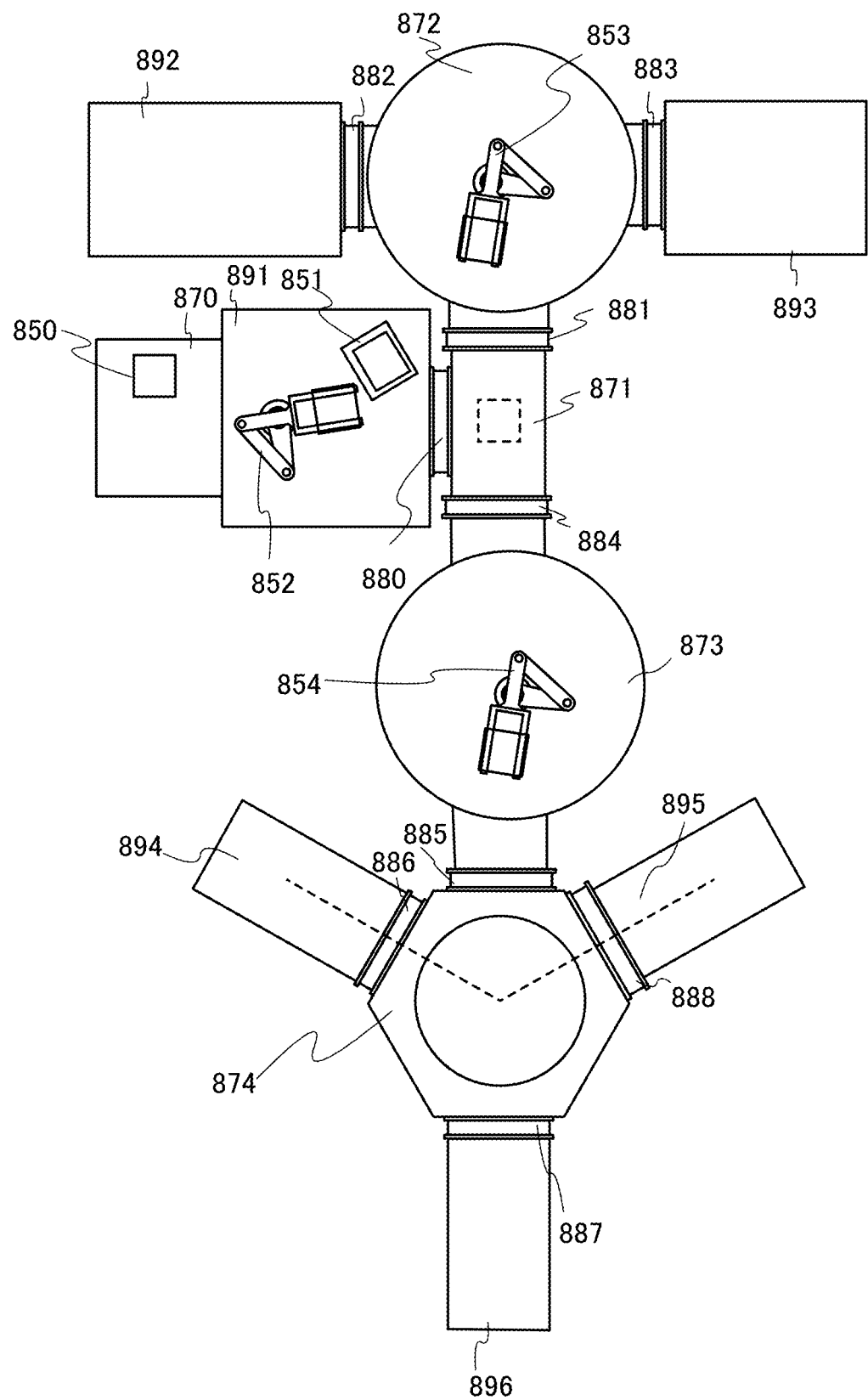
FIG. 10 is a schematic top view of a manufacturing apparatus for a secondary battery.
Figure 11:
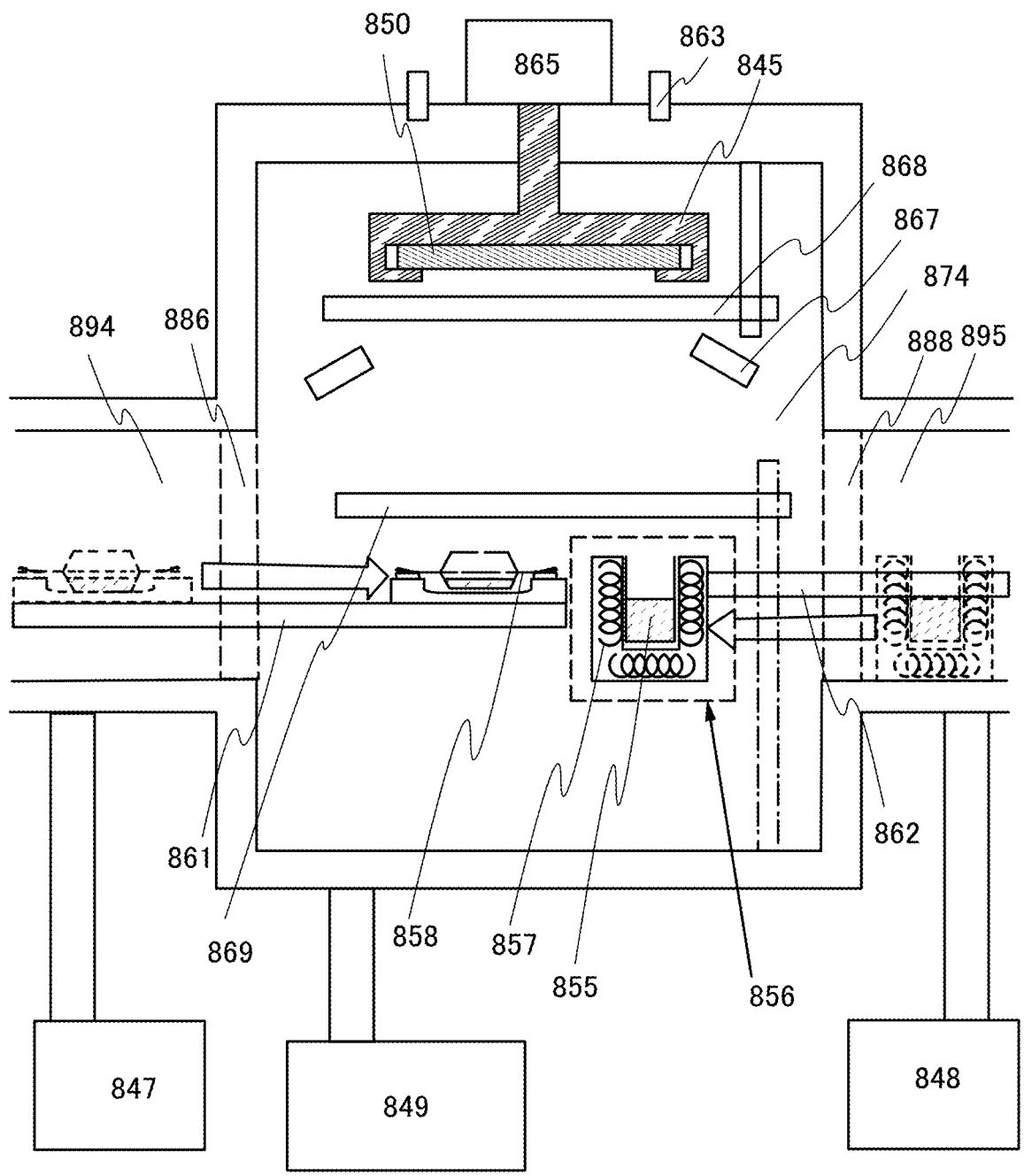
FIG. 11 is a cross-sectional view of part of a manufacturing apparatus for a secondary battery.

In this embodiment, FIG. 10 and FIG. 11 illustrate an example of a multi-chamber manufacturing apparatus capable of totally automating the manufacture from a positive electrode current collector layer to a negative electrode current collector layer in a secondary battery. The manufacturing apparatus can be suitably used for manufacturing the thin-film secondary battery of one embodiment of the present invention.

FIG. 10 illustrates an example of a multi-chamber manufacturing apparatus that includes gates 880, 881, 882, 883, 884, 885, 886, 887, and 888, a load lock chamber 870, a mask alignment chamber 891, a first transfer chamber 871, a second transfer chamber 872, a third transfer chamber 873, a plurality of deposition chambers (a first deposition chamber 892 and a second deposition chamber 874), a heating chamber 893, a second material supply chamber 894, a first material supply chamber 895, and a third material supply chamber 896.

The mask alignment chamber 891 includes at least a stage 851 and a substrate transfer mechanism 852.

The first transfer chamber 871 includes a substrate cassette raising and lowering mechanism, the second transfer chamber 872 includes a substrate transfer mechanism 853, and the third transfer chamber includes a substrate transfer mechanism 854.

Each of the first deposition chamber 892, the second deposition chamber 874, the second material supply chamber 894, the first material supply chamber 895, the third material supply chamber 896, the mask alignment chamber 891, the first transfer chamber 871, the second transfer chamber 872, and the third transfer chamber 873 is connected to an exhaust mechanism. The exhaust mechanism is selected in accordance with usage of the respective chambers, and can be, for example, an exhaust mechanism including a pump having an adsorption unit, such as a cryopump, a sputtering ion pump, or a titanium sublimation pump, or an exhaust mechanism including a turbo molecular pump provided with a cold trap.

In a procedure of film deposition on the substrate, a substrate 850 or a substrate cassette is set in the load lock chamber 870, and transferred to the mask alignment chamber 891 by the substrate transfer mechanism 852. A mask to be used is picked up among a plurality of masks set in advance in the mask alignment chamber 891, and its position is aligned with the substrate on the stage 851. After the position alignment, the gate 880 is opened, and transferring to the first transfer chamber 871 is performed by the substrate transfer mechanism 852. After the substrate is transferred to the first transfer chamber 871, the gate 881 is opened, and transferring to the second transfer chamber 872 is performed by the substrate transfer mechanism 853.

The first deposition chamber 892 provided next to the second transfer chamber 872 through the gate 882 is a sputtering deposition chamber. The sputtering deposition chamber has a mechanism of applying voltage to a sputtering target by switching an RF power source and a pulsed DC power source. Furthermore, two or three kinds of sputtering targets can be set. In this embodiment, a single crystal silicon target, a sputtering target containing lithium cobalt oxide (LiCoO₂) as a main component, and a titanium target are set. It is possible to provide a substrate heating mechanism in the first deposition chamber 892 and perform film deposition while heating is performed up to a heater temperature of 700° C.

The negative electrode active material layer can be formed by a sputtering method using a single crystal silicon target. An SiOx film formed by a reactive sputtering method using an Ar gas and an O₂ gas may be used as the negative electrode active material layer in the negative electrode. A silicon nitride film formed by a reactive sputtering method using an Ar gas and an N₂ gas can be used as a sealing film. The positive electrode active material layer can be formed by a sputtering method using a sputtering target containing lithium cobalt oxide (LiCoO₂) as a main component. A conductive film to be the current collector can be formed by a sputtering method using a titanium target. A titanium nitride film formed by a reactive sputtering method using an Ar gas and an N₂ gas can be used as the buffer layer or the base film.

In the case where the positive electrode active material layer is formed, the mask and the substrate in an overlapped state are transferred from the second transfer chamber 872 to the first deposition chamber 892 by the substrate transfer mechanism 853, the gate 882 is closed, and then film deposition is performed by a sputtering method. After the film deposition, the gate 882 and the gate 883 are opened, transferring to the heating chamber 893 is performed, the gate 883 is closed, and then heating can be performed. For the heat treatment in the heating chamber 893, an RTA (Rapid Thermal Anneal) apparatus, a resistance heating furnace, or a microwave heating apparatus can be used. As the RTA apparatus, a GRTA (Gas Rapid Thermal Anneal) apparatus or an LRTA (Lamp Rapid Thermal Anneal) apparatus can be used. The heat treatment in the heating chamber 893 can be performed in an atmosphere of nitrogen, oxygen, a rare gas, or dry air. The heating time is longer than or equal to 1 minute and shorter than or equal to 24 hours.

After the film deposition or the heat treatment, the substrate and the mask are returned to the mask alignment chamber 891 and position alignment for a new mask is performed. The substrate and the mask after being subjected to the position alignment are transferred to the first transfer chamber 871 by the substrate transfer mechanism 852. The substrate is transferred by the raising and lowering mechanism of the first transfer chamber 871, the gate 884 is opened, and transferring to the third transfer chamber 873 is performed by the substrate transfer mechanism 854.

In the second deposition chamber 874 that is connected to the third transfer chamber 873 through the gate 885, film deposition is performed by evaporation.

FIG. 11 illustrates an example of a cross-sectional structure of the second deposition chamber 874. FIG. 11 is a schematic cross-sectional view taken along the dotted line in FIG. 10. The second deposition chamber 874 is connected to an exhaust mechanism 849, and the first material supply chamber 895 is connected to an exhaust mechanism 848. The second material supply chamber 894 is connected to an exhaust mechanism 847. The second deposition chamber 874 illustrated in FIG. 11 is an evaporation chamber where evaporation is performed using an evaporation source 856 that is transferred from the first material supply chamber 895. Evaporation sources are transferred from a plurality of material supply chambers and evaporation by vaporizing a plurality of substances at the same time, that is, co-evaporation can be performed. FIG. 11 illustrates an evaporation source including an evaporation boat 858 transferred from the second material supply chamber 894.

The second deposition chamber 874 is connected to the second material supply chamber 894 through the gate 886. The second deposition chamber 874 is connected to the first material supply chamber 895 through the gate 888. The second deposition chamber 874 is connected to the third material supply chamber 896 through the gate 887. Thus, three-source co-evaporation is possible in the second deposition chamber 874.

In a procedure of evaporation, first, the substrate is provided in a substrate holding portion 845. The substrate holding portion 845 is connected to a rotation mechanism 865. Then, a first evaporation material 855 is heated to some extent in the first material supply chamber 895, the gate 888 is opened when the evaporation rate becomes stable, and an arm 862 is extended so that the evaporation source 856 is transferred and stopped below the substrate. The evaporation source 856 includes the first evaporation material 855, a heater 857, and a container for storing the first evaporation material 855. Also in the second material supply chamber 894, a second evaporation material is heated to some extent, the gate 886 is opened when the evaporation rate becomes stable, and an arm 861 is extended so that the evaporation source is transferred and stopped below the substrate.

After that, a shutter 868 and an evaporation source shutter 869 are opened, and co-evaporation is performed. During the evaporation, the rotation mechanism 865 is rotated in order to improve the uniformity of the thickness. The substrate after being subjected to the evaporation is transferred to the mask alignment chamber 891 on the same route. In the case where the substrate is extracted from the manufacturing apparatus, the substrate is transferred from the mask alignment chamber 891 to the load lock chamber 870 and extracted.

FIG. 11 illustrates an example where the substrate 850 and a mask are held by the substrate holding portion 845. The substrate 850 (and the mask) is rotated by the substrate rotation mechanism, so that uniformity of film deposition can be increased. The substrate rotation mechanism may also serve as a substrate transfer mechanism.

The second deposition chamber 874 may include an imaging unit 863 such as a CCD camera. With the imaging unit 863, the position of the substrate 850 can be confirmed.

In the second deposition chamber 874, the thickness of a film deposited on a substrate surface can be estimated from results of measurements by a film thickness measurement mechanism 867. The film thickness measurement mechanism 867 includes a crystal oscillator, for example.

The shutter 868 that overlaps the substrate until the vaporization rate of the evaporation material becomes stable and the evaporation source shutter 869 that overlaps the evaporation source 856 and the evaporation boat 858 until the vaporization rate of the evaporation material becomes stable are provided in order to control the evaporation of the vaporized evaporation material.

In the evaporation source 856, an example of a resistance heating method is shown, but an EB (Electron Beam) evaporation method may be employed. In addition, although an example of a crucible as the container for the evaporation source 856 is shown, an evaporation boat may be used. As the first evaporation material 855, an organic material is put into the crucible heated by the heater 857. In the case where pellet-like or particle-like SiO or the like is used as the evaporation material, the evaporation boat 858 is used. The evaporation boat 858 is composed of three parts, and obtained by overlapping a member having a concave surface, a middle lid having two openings, and a top lid having one opening. Note that the evaporation may be performed after the middle lid is removed. The evaporation boat 858 functions as a resistor when current flows therethrough, and has a mechanism of heating itself Although an example of a multi-chamber apparatus is described in this embodiment, there is no particular limitation and an in-line manufacturing apparatus may be used.

This embodiment can be implemented in appropriate combination with the other embodiments.

Embodiment 6

Figure 12A:
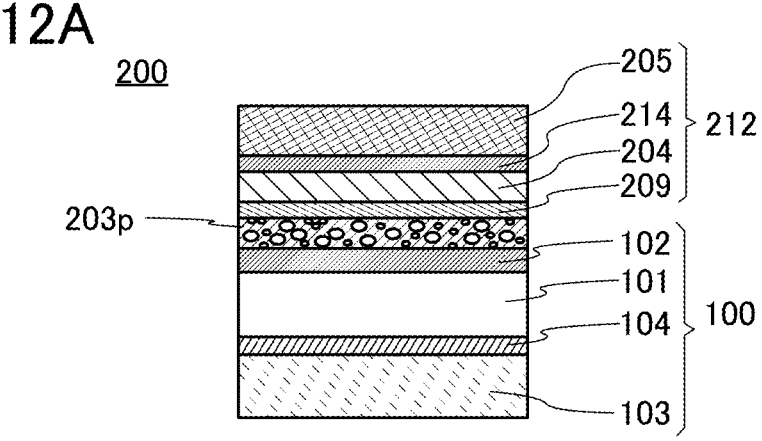
FIG. 12A to FIG. 12C are diagrams each illustrating a stacked-layer structure of a secondary battery of one embodiment of the present invention.

This embodiment will show an example where a solid electrolyte layer is porous. Note that the structure except for a porous solid electrolyte layer is the same as that in Embodiment 1; thus, detailed description is omitted in some cases. FIG. 12A illustrates an example of a stacked-layer structure of the secondary battery 200 including the secondary battery positive electrode 100 of one embodiment of the present invention.

The secondary battery 200 is a thin-film battery and includes the secondary battery positive electrode 100, which is described in Embodiment 1, a porous solid electrolyte layer 203*p* thereover, and the negative electrode 212 formed over the porous solid electrolyte layer 203*p*.

Examples of materials for the porous solid electrolyte layer 203*p* include $Li_{0.35}La_{0.55}TiO_3$, $La_{(2/3-x)}Li_{(3x)}TiO_3$, $Li_3PO_4$, $LixPO_{(4-y)}Ny$, $LiNb_{(1-x)}Ta_{(x)}WO_6$, $Li_7La_3Zr_2O_{12}$, $Li_{(1+x)}Al_{(x)}Ti_{(2-x)}(PO_4)_3$, $Li_{(1+x)}Al_{(x)}Ge_{(2-x)}(PO_4)_3$, and $LiNbO_2$. Note that X>0 and Y>0. A porous film can be obtained by a sputtering method using a porous target containing such a material.

A compound containing titanium is preferably used for porous solid electrolyte layer 203*p*. Since the buffer layer contains titanium, a secondary battery can be easily manufactured when a material containing titanium is also used for porous solid electrolyte layer 203*p*.

The porous solid electrolyte layer 203*p* may have a stacked-layer structure. In the case of employing a stacked-layer structure, a material to which nitrogen is added to lithium phosphate ($Li_3PO_4$) (the material is also referred to as $Li_3PO_{(4-z)}N_z$:LiPON) may be used in at least one layer included in the stack. Note that Z>0.

The porous solid electrolyte layer 203*p* is formed by a sputtering method, so that a mixed layer may be formed at the interface between the buffer layer and the porous solid electrolyte layer 203*p*.

The negative electrode 212 includes the negative electrode current collector 205 and the negative electrode active material layer 204. As illustrated in FIG. 12A, the negative electrode 212 preferably includes the base film 214 and the buffer layer 209.

The base film 214 is provided between the negative electrode current collector 205 and the negative electrode active material layer 204. The base film 214 has a function of increasing conductivity between the negative electrode current collector 205 and the negative electrode active material layer 204. Alternatively, the base film 214 has a function of suppressing excessive expansion of the negative electrode active material layer. Alternatively, the base film 214 has a function of inhibiting a side reaction between the negative electrode current collector 205 and the negative electrode active material layer 204.

The buffer layer 209 is provided between the negative electrode active material layer 204 and the porous solid electrolyte layer 203*p*. The buffer layer 209 has a function of inhibiting a side reaction between the negative electrode active material layer 204 and the porous solid electrolyte layer 203*p*.

The buffer layer 209 is formed by a sputtering method, so that a mixed layer may be formed at the interface between the porous solid electrolyte layer 203*p* and the buffer layer 209.

The porous solid electrolyte layer 203*p* is provided between the secondary battery positive electrode 100 and the negative electrode 212.

Figure 12B:
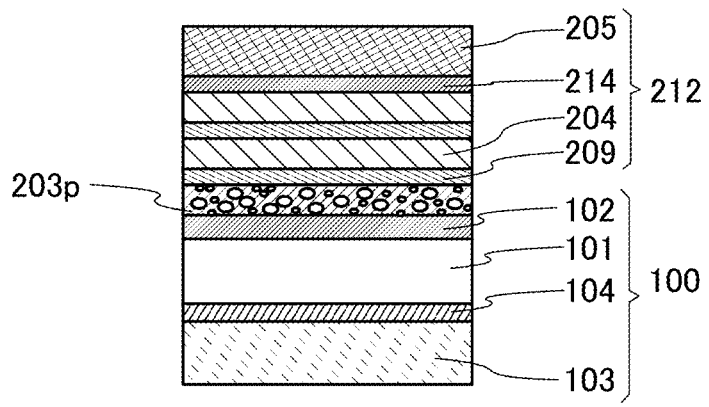

As illustrated in FIG. 12B, the secondary battery 200 may include the negative electrode 212 in which a plurality of negative electrode active material layers 204 and a plurality of buffer layers 209 are stacked. When a plurality of negative electrode active material layers 204 and a plurality of buffer layers 209 are stacked, excessive expansion of the negative electrode 212 can be suppressed while the capacity is increased. In this case, the buffer layer 209 in contact with the porous solid electrolyte layer 203*p* and the buffer layer 209 sandwiched between the negative electrode active material layers 204 may be formed using the same material or different materials. For example, titanium oxide may be used for the buffer layer 209 in contact with the porous solid electrolyte layer 203p, and titanium nitride may be used for the buffer layer 209 sandwiched between the negative electrode active material layers 204. In the negative electrode 212 in which a plurality of negative electrode active material layers 204 and a plurality of buffer layers 209 are stacked, the thickness range of each buffer layer 209 is from 5 nm to 40 nm, and the thickness range of each negative electrode active material layer 204 is from 20 nm to 100 nm.

A mixed layer may be formed at the interface between the buffer layer 209 and the negative electrode active material layer 204.

Figure 12C:
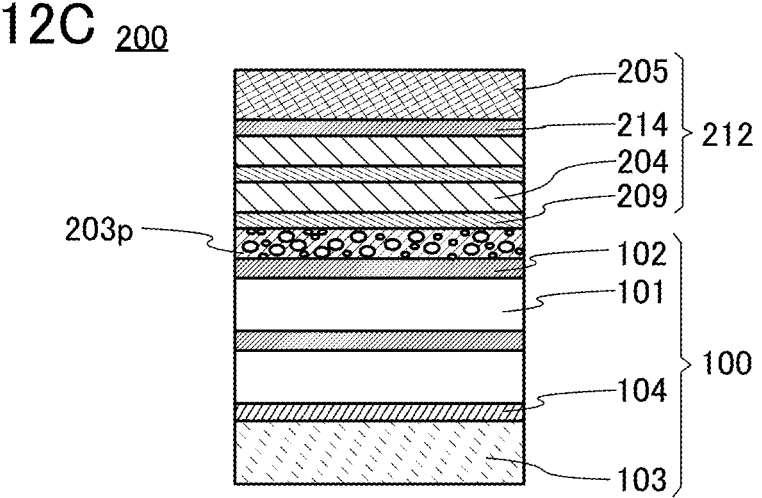

As illustrated in FIG. 12C, the secondary battery 200 may include the secondary battery positive electrode 100 in which a plurality of positive electrode active material layers 101 and a plurality of buffer layers 102 are stacked. When a plurality of positive electrode active material layers 101 and a plurality of buffer layers 102 are stacked, collapse of a crystal structure included in the positive electrode active material layers 101 can be suppressed while the capacity is increased. In this case, the buffer layer 102 in contact with the porous solid electrolyte layer 203*p* and the buffer layer 102 sandwiched between the positive electrode active material layers 101 may be formed using the same material or different materials. For example, titanium oxide may be used for the buffer layer 102 in contact with the porous solid electrolyte layer 203p, and titanium nitride may be used for the buffer layer 102 sandwiched between the positive electrode active material layers 101.

This embodiment can be freely combined with the other embodiments.

Embodiment 7

In this embodiment, examples of electronic devices using thin-film secondary batteries will be described with reference to FIG. 13A, FIG. 13B, and FIG. 14A to FIG. 14C. The secondary battery of one embodiment of the present invention has high discharge capacity, high cycle performance, and a high level of safety. Thus, the electronic devices ensure a high level of safety and can be used for a long time.

Figure 13A:
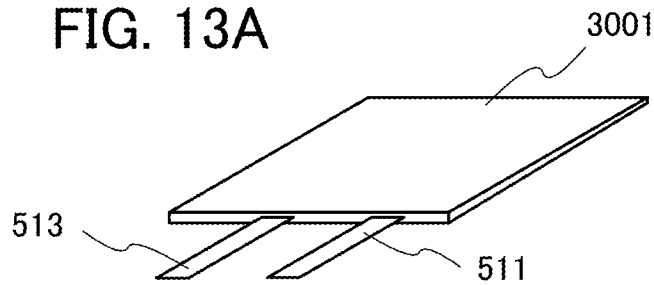
FIG. 13A is a perspective view of a battery cell.

FIG. 13A is an external perspective view of a thin-film-type secondary battery 3001. The thin-film-type secondary battery 3001 is sealed with a laminate film or an insulating film such that a positive electrode lead electrode 513 electrically connected to a positive electrode of a solid-state secondary battery and a negative electrode lead electrode 511 electrically connected to a negative electrode project.

Figure 13B:
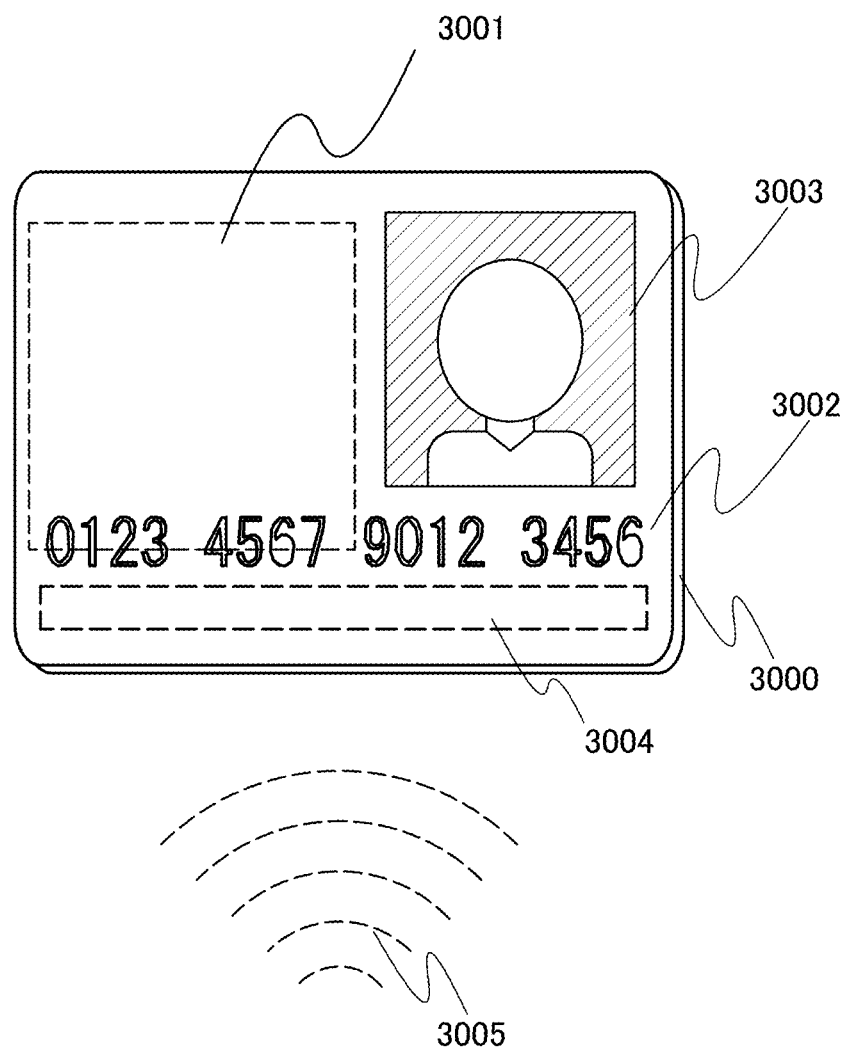
FIG. 13B is a diagram illustrating an example of an electronic device.

FIG. 13B illustrates an IC card that is an example of an application device using the thin-film-type secondary battery of the present invention. The thin-film-type secondary battery 3001 can be charged with electric power obtained by power feeding from a radio wave 3005. An antenna, an IC 3004, and the thin-film-type secondary battery 3001 are provided inside an IC card 3000. An ID 3002 and a photograph 3003 of a worker who wears the management badge are displayed on the IC card 3000. A signal such as an authentication signal can be transmitted from the antenna using the electric power charged in the thin-film-type secondary battery 3001.

An active matrix display device may be provided to display the ID 3002 and the photograph 3003. Examples of the active matrix display device include a reflective liquid crystal display device, an organic EL display device, and electronic paper. An image (a moving image or a still image) or the time can be displayed on the active matrix display device. Electric power for the active matrix display device can be supplied from the thin-film-type secondary battery 3001.

A plastic substrate is used for the IC card, and thus an organic EL display device using a flexible substrate is preferable.

A solar cell may be provided instead of the photograph 3003. By irradiation with external light, light can be absorbed to generate electric power, and the thin-film-type secondary battery 3001 can be charged with the electric power.

Without limitation to the IC card, the thin-film-type secondary battery can be used for a power source of an in-vehicle wireless sensor, a secondary battery for a MEMS device, and the like.

Figure 14A:
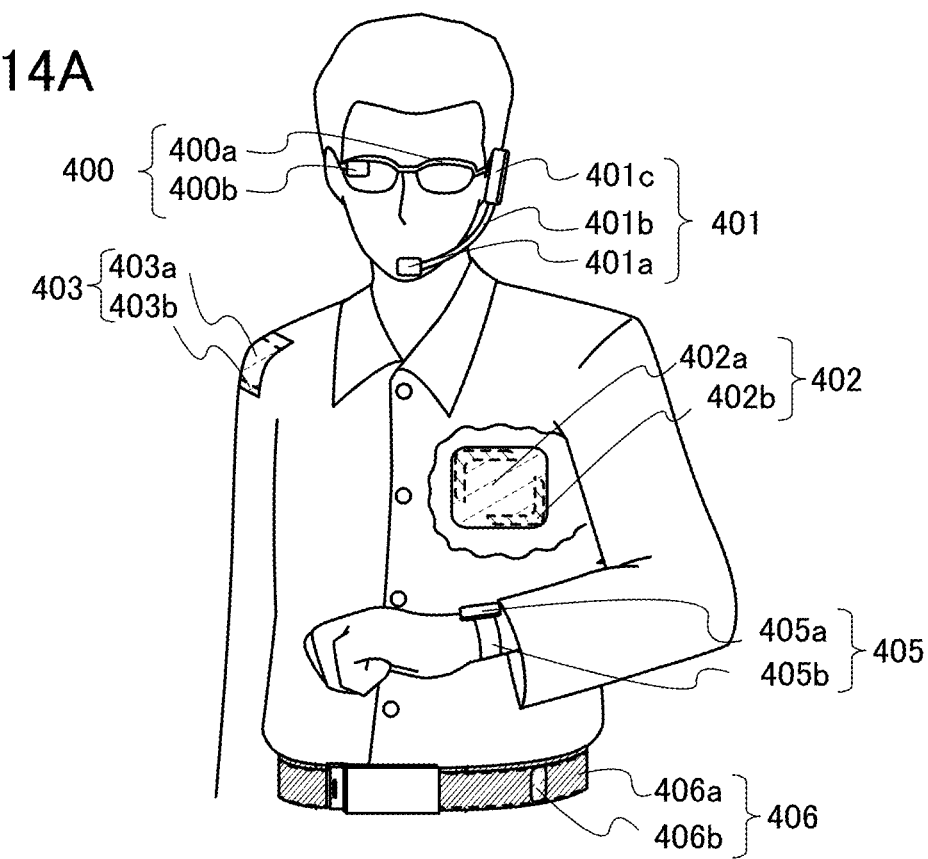
FIG. 14A to FIG. 14C are diagrams illustrating examples of electronic devices.

FIG. 14A illustrates examples of wearable devices. A secondary battery is used as a power source of a wearable device. To have improved splash resistance, water resistance, or dust resistance in daily use or outdoor use by a user, a wearable device is desirably capable of being charged wirelessly as well as being charged with a wire whose connector portion for connection is exposed.

For example, the secondary battery of one embodiment of the present invention can be incorporated in a glasses-type device 400 illustrated in FIG. 14A. The glasses-type device 400 includes a frame 400a and a display portion 400b. The secondary battery is incorporated in a temple of the frame 400a having a curved shape, whereby the glasses-type device 400 can be lightweight, have a well-balanced weight, and be used continuously for a long time. The use of the secondary battery of one embodiment of the present invention enables a structure that accommodates space saving due to downsizing of the housing.

The secondary battery of one embodiment of the present invention can be incorporated in a headset-type device 401. The headset-type device 401 includes at least a microphone portion 401a, a flexible pipe 401b, and an earphone portion 401c. The secondary battery can be provided in the flexible pipe 401b or the earphone portion 401c. The use of the secondary battery of one embodiment of the present invention enables a structure that accommodates space saving due to downsizing of the housing.

The secondary battery of one embodiment of the present invention can be incorporated in a device 402 that can be directly attached to a human body. A secondary battery 402b can be provided in a thin housing 402a of the device 402. The use of the secondary battery of one embodiment of the present invention enables a structure that accommodates space saving due to downsizing of the housing.

The secondary battery of one embodiment of the present invention can be incorporated in a device 403 that can be attached to clothing. A secondary battery 403b can be provided in a thin housing 403a of the device 403. The use of the secondary battery of one embodiment of the present invention enables a structure that accommodates space saving due to downsizing of the housing.

The secondary battery of one embodiment of the present invention can be incorporated in a belt-type device 406. The belt-type device 406 includes a belt portion 406a and a wireless power feeding and receiving portion 406b, and the secondary battery can be incorporated in the belt portion 406a. The use of the secondary battery of one embodiment of the present invention enables a structure that accommodates space saving due to downsizing of the housing.

The secondary battery of one embodiment of the present invention can be incorporated in a watch-type device 405. The watch-type device 405 includes a display portion 405a and a belt portion 405b, and the secondary battery can be provided in the display portion 405a or the belt portion 405b. The use of the secondary battery of one embodiment of the present invention enables a structure that accommodates space saving due to downsizing of the housing.

The display portion 405a can display various kinds of information such as reception information of an e-mail or an incoming call in addition to time.

Since the watch-type device 405 is a type of wearable device that is directly wrapped around an arm, a sensor that measures pulse, blood pressure, or the like of a user can be incorporated therein. Data on the exercise quantity and health of the user can be stored and used for health maintenance.

Figure 14B:
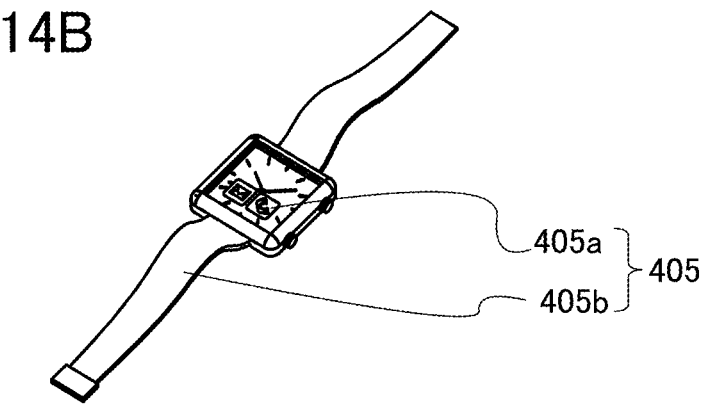

FIG. 14B is a perspective view of the watch-type device 405 that is detached from an arm.

Figure 14C:
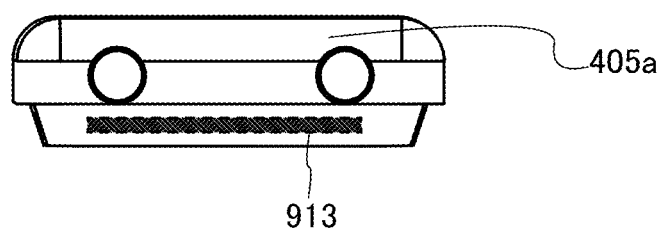

FIG. 14C is a side view. FIG. 14C illustrates a state where a secondary battery 913 is incorporated inside. The secondary battery 913 is the secondary battery described in Embodiment 5. The secondary battery 913 is provided at a position overlapped by the display portion 405a and is small and lightweight.

This embodiment can be implemented in appropriate combination with the other embodiments.

Embodiment 8

In this embodiment, electronic devices using the secondary battery including the positive electrode of one embodiment of the present invention will be described with reference to FIG. 15A to FIG. 15C and FIG. 16A to FIG. 16D. The secondary battery including the positive electrode of one embodiment of the present invention has high discharge capacity, high cycle performance, and a high level of safety. Such a secondary battery can be favorably used in electronic devices given below. The secondary battery can be favorably used particularly in electronic devices that are required to have durability.

Figure 15A:
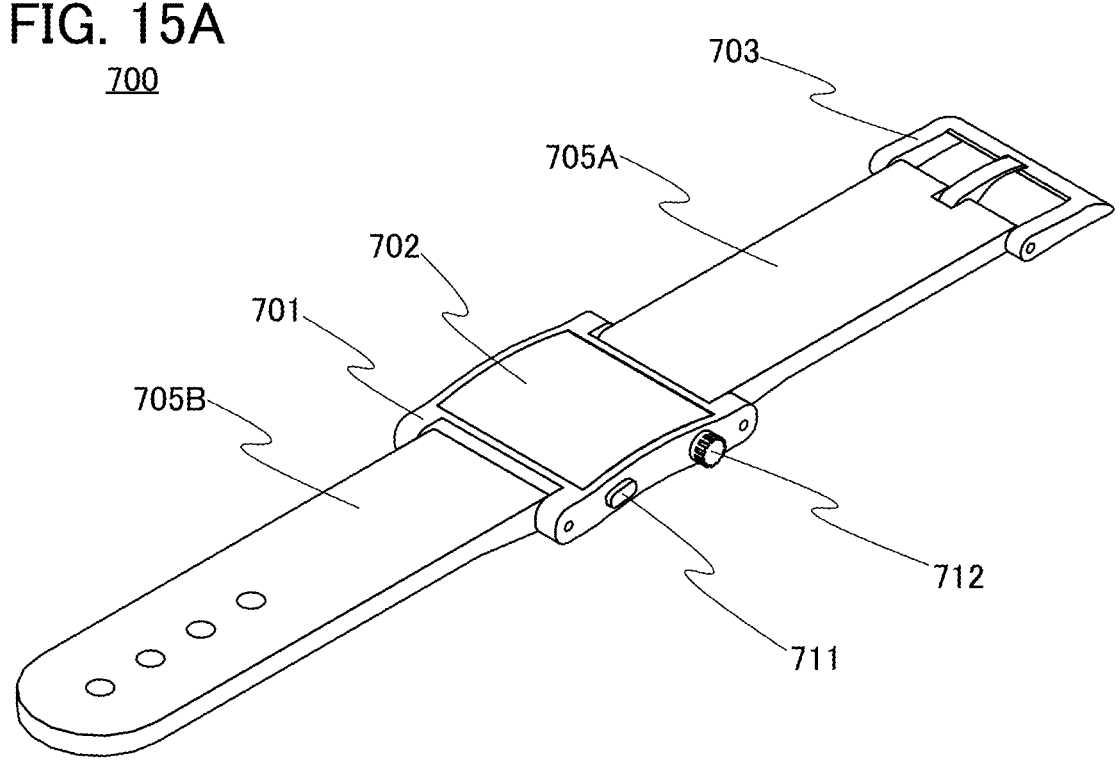
FIG. 15A to FIG. 15C are diagrams illustrating an example of an electronic device.

FIG. 15A is a perspective view of a watch-type portable information terminal (also called a smartwatch (registered trademark)) 700. The portable information terminal 700 includes a housing 701, a display panel 702, a clasp 703, bands 705A and 705B, and operation buttons 711 and 712.

The display panel 702 mounted in the housing 701 doubling as a bezel includes a rectangular display region.

The display region has a curved surface. The display panel 702 preferably has flexibility. Note that the display region may be non-rectangular.

The band 705A and the band 705B are connected to the housing 701. The clasp 703 is connected to the band 705A. The band 705A and the housing 701 are connected such that a connection portion rotates via a pin, for example. The same applies to the connection between the band 705B and the housing 701 and between the band 705A and the clasp 703.

Figure 15B:
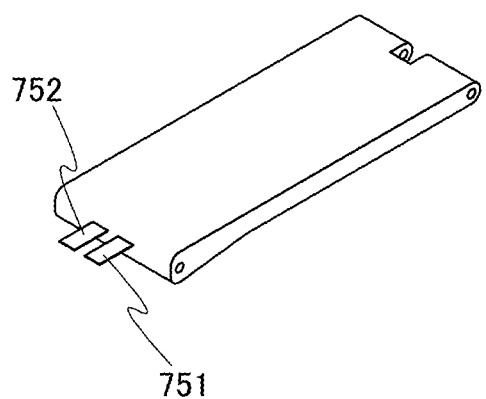
Figure 15C:
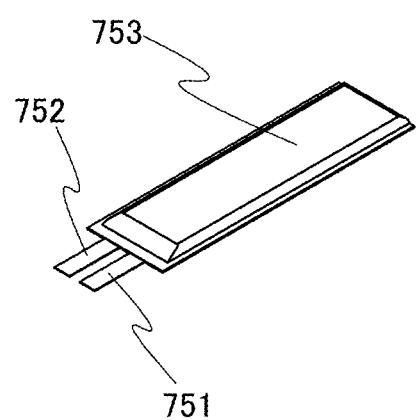

FIG. 15B and FIG. 15C are perspective views of the band 705A and a secondary battery 750, respectively. The band 705A includes the secondary battery 750. As the secondary battery 750, the secondary battery described in the foregoing embodiment can be used, for example. The secondary battery 750 is embedded in the band 705A, and a positive electrode lead 751 and a negative electrode lead 752 partly protrude from the band 705A (see FIG. 15B). The positive electrode lead 751 and the negative electrode lead 752 are electrically connected to the display panel 702. The surface of the secondary battery 750 is covered with an exterior body 753 (see FIG. 15C). Note that the pin may have a function of an electrode. Specifically, through the pin that connects the band 705A and the housing 701, the positive electrode lead 751 and the display panel 702 may be electrically connected to each other and the negative electrode lead 752 and the display panel 702 may be electrically connected to each other. This simplifies the structure of the connection portion between the band 705A and the housing 701.

The secondary battery 750 has flexibility. Thus, the band 705A can be formed so as to incorporate the secondary battery 750. For example, the secondary battery 750 is set in a mold that matches the outer shape of the band 705A, and a material of the band 705A is poured in the mold and cured, so that the band 705A illustrated in FIG. 15B can be formed.

In the case where a rubber material is used as the material for the band 705A, rubber is cured through heat treatment. For example, in the case where fluorine rubber is used as a rubber material, it is cured through heat treatment at 170° C. for 10 minutes. In the case where silicone rubber is used as a rubber material, it is cured through heat treatment at 150° C. for 10 minutes.

Examples of the material for the band 705A include fluorine rubber, silicone rubber, fluorosilicone rubber, and urethane rubber.

The portable information terminal 700 illustrated in FIG. 15A can have a variety of functions. The portable information terminal 700 can have, for example, a function of displaying a variety of information (e.g., a still image, a moving image, and a text image) on the display region, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data written in a recording medium and displaying it on the display region.

The housing 701 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the portable information terminal 700 can be manufactured using a light-emitting element in the display panel 702.

Although FIG. 15A illustrates the example where the secondary battery 750 is incorporated in the band 705A, the secondary battery 750 may be incorporated in the band 705B. The band 705B can be formed using a material similar to that for the band 705A.

Figure 16A:
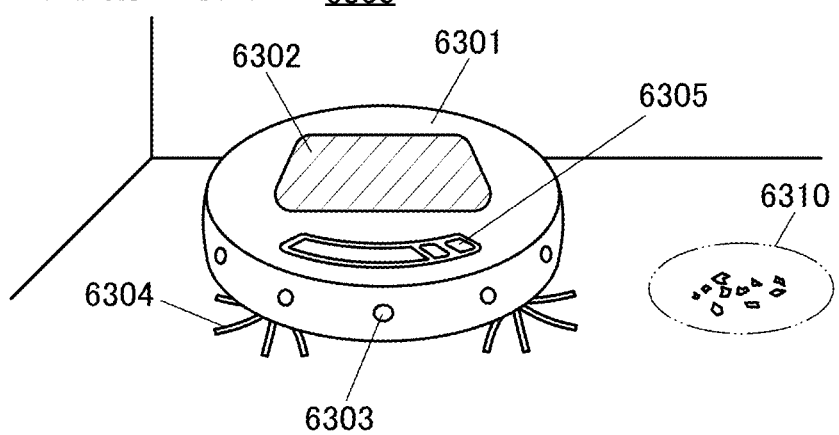
FIG. 16A to FIG. 16D are diagrams illustrating examples of electronic devices.

FIG. 16A illustrates an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a variety of sensors, and the like. Although not illustrated, the cleaning robot 6300 is provided with a tire, an inlet, and the like. The cleaning robot 6300 can run autonomously, detect dust 6310, and vacuum the dust through the inlet provided on a bottom surface.

For example, the cleaning robot 6300 can analyze images taken by the cameras 6303 to judge whether there are obstacles such as a wall, furniture, or a step. When an object that is likely to be caught in the brush 6304, such as a wire, is detected by image analysis, the rotation of the brush 6304 can be stopped. The cleaning robot 6300 internally includes the secondary battery of one embodiment of the present invention and a semiconductor device or an electronic component. The cleaning robot 6300 including the secondary battery of one embodiment of the present invention can be a highly reliable electronic device that can operate for a long time.

Figure 16B:
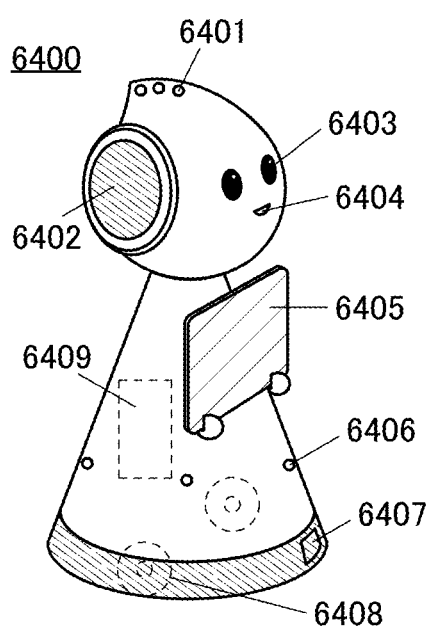

FIG. 16B illustrates an example of a robot. A robot 6400 illustrated in FIG. 16B includes a secondary battery 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with a user with the use of the microphone 6402 and the speaker 6404.

The display portion 6405 has a function of displaying various kinds of information. The robot 6400 can display information desired by a user on the display portion 6405. A touch panel may be incorporated in the display portion 6405. Moreover, the display portion 6405 may be a detachable information terminal, in which case charging and data communication can be performed when the display portion 6405 is set at the home position of the robot 6400.

The upper camera 6403 and the lower camera 6406 each have a function of taking images of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 internally includes the secondary battery 6409 secondary battery of one embodiment of the present invention and a semiconductor device or an electronic component. The robot 6400 including the secondary battery of one embodiment of the present invention can be a highly reliable electronic device that can operate for a long time.

Figure 16C:
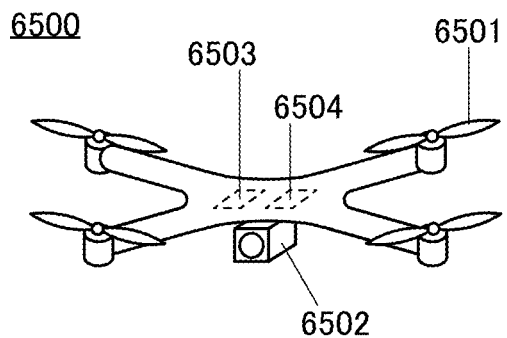

FIG. 16C illustrates an example of a flying object. A flying object 6500 illustrated in FIG. 16C includes propellers 6501, a camera 6502, a secondary battery 6503, and the like and has a function of flying autonomously.

For example, image data taken by the camera 6502 is stored in an electronic component 6504. The electronic component 6504 can analyze the image data to detect whether there are obstacles when the flying object moves. Moreover, the electronic component 6504 can estimate the remaining battery level from a change in the power storage capacity of the secondary battery 6503. The flying object 6500 internally includes the secondary battery 6503 of one embodiment of the present invention. The flying object 6500 including the secondary battery of one embodiment of the present invention can be a highly reliable electronic device that can operate for a long time.

Figure 16D:
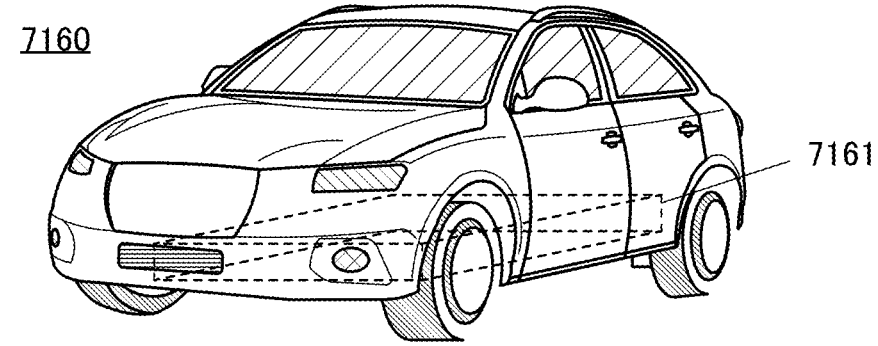

FIG. 16D illustrates an example of an automobile. An automobile 7160 includes a secondary battery 7161, an engine, tires, a brake, a steering gear, a camera, and the like. The automobile 7160 internally includes the secondary battery 7161 of one embodiment of the present invention. The automobile 7160 using the secondary battery of one embodiment of the present invention can be a high-mileage automobile with a high level of safety and high reliability.

This embodiment can be implemented in appropriate combination with the other embodiments.

REFERENCE NUMERALS

100: secondary battery positive electrode, 101: positive electrode active material layer, 102: buffer layer, 103: positive electrode current collector, 104: base film, 110: substrate, 200: secondary battery, 201: secondary battery, 202: secondary battery, 203: solid electrolyte layer, 203p: porous solid electrolyte layer, 204: negative electrode active material layer, 205: negative electrode current collector, 206: protective layer, 209: buffer layer, 210: negative electrode, 211: negative electrode, 212: negative electrode, 213: solid electrolyte layer, 214: base film, 215: positive electrode current collector, 400: glasses-type device, 400a: frame, 400b: display portion, 401: headset-type device, 401a: microphone portion, 401b: flexible pipe, 401c: earphone portion, 402: device, 402a: housing, 402b: secondary battery, 403: device, 403a: housing, 403b: secondary battery, 405: watch-type device, 405a: display portion, 405b: belt portion, 406: belt-type device, 406a: belt portion, 406b: wireless power feeding and receiving portion, 511: negative electrode lead electrode, 513: positive electrode lead electrode, 700: portable information terminal, 701: housing, 702: display panel, 703: clasp, 705A: band, 705B: band, 711: operation button, 712: operation button, 750: secondary battery, 751: positive electrode lead, 752: negative electrode lead, 753: exterior body, 845: substrate holding portion, 847: exhaust mechanism, 848: exhaust mechanism, 849: exhaust mechanism, 850: substrate, 851: stage, 852: substrate transfer mechanism, 853: substrate transfer mechanism, 854: substrate transfer mechanism, 855: evaporation material, 856: evaporation source, 857: heater, 858: evaporation boat, 861: arm, 862: arm, 863: imaging unit, 865: rotation mechanism, 867: film thickness measurement mechanism, 868: shutter, 869: evaporation source shutter, 870: load lock chamber, 871: transfer chamber, 872: transfer chamber, 873: transfer chamber, 874: deposition chamber, 880: gate, 881: gate, 882: gate, 883: gate, 884: gate, 885: gate, 886: gate, 887: gate, 888: gate, 891: mask alignment chamber, 892: deposition chamber, 893: heating chamber, 894: material supply chamber, 895: material supply chamber, 896: material supply chamber, 913: secondary battery, 3000: IC card, 3001: thin-film-type secondary battery, 3002: ID, 3003: photograph, 3004: IC, 3005: radio wave, 6300: cleaning robot, 6301: housing, 6302: display portion, 6303: camera, 6304: brush, 6305: operation button, 6310: dust, 6400: robot, 6401: illuminance sensor, 6402: microphone, 6403: upper camera, 6404: speaker, 6405: display portion, 6406: lower camera, 6407: obstacle sensor, 6408: moving mechanism, 6409: secondary battery, 6500: flying object, 6501: propeller, 6502: camera, 6503: secondary battery, 6504: electronic component, 7160: automobile, 7161: secondary battery

The invention claimed is:

1. A secondary battery comprising:
   a positive electrode active material layer;
   a buffer layer over the positive electrode active material layer; and
   a solid electrolyte layer over the buffer layer,
   wherein the solid electrolyte layer comprises a titanium compound,
   wherein the positive electrode active material layer comprises lithium cobalt oxide, and
   wherein the buffer layer comprises a titanium compound.

2. A secondary battery comprising:
   a base film over a current collector;
   a positive electrode active material layer over the base film;
   a buffer layer over the positive electrode active material layer; and
   a solid electrolyte layer over the buffer layer,
   wherein the solid electrolyte layer comprises a titanium compound,
   wherein the positive electrode active material layer comprises lithium cobalt oxide,
   wherein the buffer layer comprises a titanium compound, and
   wherein the base film comprises a titanium compound.

3. The secondary battery according to claim 2,
   wherein a crystal structure included in the base film and a crystal structure included in the positive electrode active material layer each comprise a plane where only anions are arranged.

4. The secondary battery according to claim 2,
   wherein the base film comprises titanium nitride.

5. The secondary battery according to claim 1,
   wherein the positive electrode active material layer comprises at least one of nickel, aluminum, magnesium, and fluorine.

6. The secondary battery according to claim 1, further comprising a negative electrode active material layer over the solid electrolyte layer.

7. The secondary battery according to claim 1,
   wherein the buffer layer comprises titanium oxide.

8. The secondary battery according to claim 1,
   wherein the solid electrolyte layer is porous.

9. The secondary battery according to claim 2,
   wherein the base film, the positive electrode active material layer, the buffer layer, and the solid electrolyte layer are formed by a sputtering method.

10. The secondary battery according to claim 2,
    wherein the positive electrode active material layer comprises at least one of nickel, aluminum, magnesium, and fluorine.

11. The secondary battery according to claim 2, further comprising a negative electrode active material layer over the solid electrolyte layer.

12. The secondary battery according to claim 2,
    wherein the buffer layer comprises titanium oxide.

13. The secondary battery according to claim 2,
    wherein the solid electrolyte layer is porous.

14. A secondary battery comprising:
a base film over a current collector;
a positive electrode active material layer over the base film;
a buffer layer over the positive electrode active material layer; and
a solid electrolyte layer over the buffer layer,
wherein the solid electrolyte layer comprises a titanium compound,
wherein the positive electrode active material layer comprises lithium cobalt oxide,
wherein the buffer layer comprises titanium and oxygen, and
wherein the base film comprises titanium and oxygen.

15. The secondary battery according to claim 14, wherein a crystal structure included in the base film and a crystal structure included in the positive electrode active material layer each comprise a plane where only anions are arranged.

16. The secondary battery according to claim 14, wherein the base film comprises titanium nitride.

\* \* \* \* \*